(12) United States Patent
Terada et al.

(10) Patent No.: US 8,609,774 B2
(45) Date of Patent: Dec. 17, 2013

(54) BELT

(75) Inventors: Junpei Terada, Settsu (JP); Daisuke Ota, Settsu (JP); Masanori Kitaichi, Settsu (JP); Yutaka Ueta, Settsu (JP); Shigeru Morita, Settsu (JP); Kazuyoshi Kawasaki, Settsu (JP); Tatsuya Morikawa, Settsu (JP); Shoji Fukuoka, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 16 days.

(21) Appl. No.: 13/217,328

(22) Filed: Aug. 25, 2011

(65) Prior Publication Data

US 2012/0067706 A1  Mar. 22, 2012

Related U.S. Application Data

(60) Provisional application No. 61/377,029, filed on Aug. 25, 2010.

(51) Int. Cl.
*C08F 8/00* (2006.01)

(52) U.S. Cl.
USPC ........ 525/192; 198/844.1; 474/237; 524/495; 524/496

(58) Field of Classification Search
USPC ................ 525/192; 524/495, 496; 198/844.1; 474/237
See application file for complete search history.

(56) References Cited

U.S. PATENT DOCUMENTS

| | | | |
|---|---|---|---|
| 4,467,074 A | 8/1984 | Oka et al. | |
| 4,543,394 A | 9/1985 | Finlay et al. | |
| 4,737,526 A | 4/1988 | Mukaiyama et al. | |
| 5,902,857 A | 5/1999 | Wlassics et al. | |
| 5,948,868 A | 9/1999 | Albano et al. | |
| 6,367,525 B1 | 4/2002 | Hiruma et al. | |
| 6,543,785 B1 | 4/2003 | Katayama et al. | |
| 6,878,778 B1 | 4/2005 | Kawasaki et al. | |
| 7,368,506 B2 * | 5/2008 | Kanenari ................ | 525/192 |
| 2005/0147828 A1 | 7/2005 | Verschuere et al. | |
| 2005/0256233 A1 | 11/2005 | Ocho et al. | |
| 2005/0282969 A1 | 12/2005 | Comino et al. | |
| 2006/0058450 A1 | 3/2006 | Amemiya et al. | |
| 2007/0219332 A1 | 9/2007 | Washino et al. | |
| 2008/0275184 A1* | 11/2008 | Karato et al. ................ | 525/105 |
| 2010/0209644 A1 | 8/2010 | Abe et al. | |
| 2011/0152487 A1 | 6/2011 | Cook et al. | |
| 2012/0073696 A1 | 3/2012 | Terada et al. | |
| 2012/0077924 A1 | 3/2012 | Ota et al. | |
| 2012/0077925 A1 | 3/2012 | Terada et al. | |
| 2012/0077926 A1 | 3/2012 | Ota et al. | |
| 2012/0077927 A1 | 3/2012 | Ota et al. | |
| 2012/0077938 A1 | 3/2012 | Ota et al. | |
| 2012/0077939 A1 | 3/2012 | Ota et al. | |
| 2012/0095150 A1 | 4/2012 | Ota et al. | |
| 2012/0095151 A1 | 4/2012 | Terada et al. | |
| 2012/0202938 A1 | 8/2012 | Kawai et al. | |

FOREIGN PATENT DOCUMENTS

| | | |
|---|---|---|
| EP | 0168020 A2 | 1/1986 |
| JP | 52-078951 | 7/1977 |
| JP | 56-086948 A | 7/1981 |
| JP | 58-037041 A | 3/1983 |
| JP | 60-055050 A | 3/1985 |
| JP | 61-057641 A | 3/1986 |
| JP | 62-252435 A | 11/1987 |
| JP | 03-122153 A | 5/1991 |
| JP | 03-217482 * | 9/1991 |
| JP | 03-217482 A | 9/1991 |
| JP | 05-086236 A | 4/1993 |
| JP | 06-001891 A | 1/1994 |
| JP | 06-025500 A | 2/1994 |
| JP | 07-233331 * | 9/1995 |
| JP | 07-233331 A | 9/1995 |
| JP | 08-134269 A | 5/1996 |
| JP | 09-124870 A | 5/1997 |
| JP | 09-124871 A | 5/1997 |
| JP | 09-188793 A | 7/1997 |
| JP | 11-344165 * | 12/1999 |
| JP | 11-344165 A | 12/1999 |
| JP | 2000-193152 A | 7/2000 |
| JP | 2000-240730 A | 9/2000 |
| JP | 2001-049048 A | 2/2001 |
| JP | 2001-150595 A | 6/2001 |
| JP | 2001-192482 A | 7/2001 |
| JP | 2003-013041 * | 1/2003 |
| JP | 2003-013041 A | 1/2003 |
| JP | 2003-083479 A | 3/2003 |
| JP | 2004-210830 A | 7/2004 |
| JP | 2005-003878 * | 1/2005 |
| JP | 2005-003878 A | 1/2005 |
| JP | 2005-239835 A | 9/2005 |
| JP | 2005-315415 A | 11/2005 |
| JP | 2006-009010 A | 1/2006 |
| JP | 2006-022917 A | 1/2006 |
| JP | 2006-052399 A | 2/2006 |
| JP | 2007-040363 A | 2/2007 |
| JP | 2007-126539 A | 5/2007 |
| JP | 2007-269008 A | 10/2007 |

(Continued)

OTHER PUBLICATIONS

International Search Report mailed Oct. 25, 2011 for corresponding PCT Application No. PCT/JP2011/069202.
Meng-Jiao Wang, et al.; "Carbon Black"; Encyclopedia of Polymer Science and Technology; Copyright: John Wiley & Sons, Inc.; vol. 9; Oct. 15, 2003; pp. 52-91.

*Primary Examiner* — Peter D. Mulcahy
*Assistant Examiner* — Henry Hu
(74) *Attorney, Agent, or Firm* — Sughrue Mion, PLLC

(57) ABSTRACT

The present invention provides a belt excellent in mechanical properties at high temperatures. The belt of the present invention comprises a cross-linked fluororubber layer obtainable by cross-linking a fluororubber composition containing a fluororubber (A) and a carbon black (B). The cross-linked fluororubber layer has a loss modulus E" of 400 kPa or higher and 6,000 kPa or lower determined by a dynamic viscoelasticity test (measurement temperature: 160° C., tensile strain: 1%, initial force: 157 cN, frequency: 10 Hz).

14 Claims, No Drawings

(56) References Cited

FOREIGN PATENT DOCUMENTS

| | | | |
|---|---|---|---|
| JP | 2008-127429 A | 6/2008 | |
| JP | 2008-184496 A | 8/2008 | |
| JP | 2009-024046 A | 2/2009 | |
| JP | 2009-035578 | * | 2/2009 |
| JP | 2009-035578 A | 2/2009 | |
| JP | 2009-102571 | * | 5/2009 |
| JP | 2009-102571 A | 5/2009 | |
| JP | 2009-138053 A | 6/2009 | |
| JP | 2009-298949 A | 12/2009 | |
| WO | 03074625 A1 | 9/2003 | |
| WO | WO 2006040944 A1 | 4/2006 | |
| WO | WO 2008003634 A1 | 1/2008 | |
| WO | WO 2008003635 A1 | 1/2008 | |
| WO | WO 2008003636 A1 | 1/2008 | |

\* cited by examiner

BELT

CROSS-REFERENCE TO RELATED APPLICATION

This application claims benefit under 35 U.S.C. §119(e) of U.S. Provisional Application No. 61/377,029 filed on Oct. 25, 2010, incorporated herein by reference in its entirety.

TECHNICAL FIELD

The present invention relates to a belt such as a power transmission belt.

BACKGROUND ART

Belts to be used under high-temperature conditions, for example, in internal combustion engines, require heat-resistant characteristics such as heat-aging resistance. Belts used in the vicinity of automobile engines require heat resistance under higher-temperature conditions. In order to achieve these various required characteristics, various rubber materials are being developed.

For example, belt materials containing an adhesiveness improver and carbon black are adopted from the viewpoints of heat resistance and adhesiveness, and various belts made from these belt materials are proposed (Patent Documents 1 to 4). Further, a belt is proposed which is obtained by molding a rubber composition containing fluororubber and carbon that is produced by the FT method (Patent Document 5).

Patent Document 1: JP 2009-102571 A
Patent Document 2: JP 2006-22917 A
Patent Document 3: JP 2005-315415 A
Patent Document 4: JP 2000-240730 A
Patent Document 5: JP 2007-40363 A

SUMMARY OF THE INVENTION

Problems to be Solved by the Invention

Although fluororubber is excellent in heat-aging resistance, chemical resistance, and oil resistance, it is insufficient in mechanical properties at high temperatures such as strength at high temperature and elongation at high temperature. Thus, fluororubber belts used under high-temperature conditions are expected to have improved durability.

An object of the present invention is to provide a belt excellent in mechanical properties at high temperatures.

Means for Solving the Problems

The present inventors have performed diligent studies and focused on the loss modulus (E"). They have found that a fluororubber belt having a specific loss modulus is excellent in mechanical properties at high temperatures. Thereby, they have completed the present invention.

In other words, the present invention relates to a belt comprising a cross-linked fluororubber layer obtainable by cross-linking a fluororubber composition containing a fluororubber (A) and a carbon black (B), wherein the cross-linked fluororubber layer has a loss modulus E" of 400 kPa or higher and 6,000 kPa or lower determined by a dynamic viscoelasticity test under conditions of measurement temperature: 160° C., tensile strain: 1%, initial force: 157 cN, and frequency: 10 Hz.

Further, the cross-linked fluororubber layer preferably has a storage modulus E' of 1,500 kPa or higher and 20,000 kPa or lower determined by a dynamic viscoelasticity test under conditions of measurement temperature: 160° C., tensile strain: 1%, initial force: 157 cN, and frequency: 10 Hz.

The carbon black (B) which gives the loss modulus E" in the above range and further preferably the storage modulus E' in the above range to the cross-linked fluororubber layer is preferably a carbon black having a nitrogen adsorption specific surface area ($N_2SA$) of 5 to 180 $m^2/g$ and a dibutyl phthalate (DBP) oil absorption of 40 to 180 ml/100 g. This is because such a carbon black forms a carbon gel network reinforcing structure with fluororubber and thereby improves normal state at room temperature and mechanical properties at high temperatures.

Preferable examples of the fluororubber (A) include vinylidene fluoride copolymer, tetrafluoroethylene/perfluoro (alkyl vinyl ether) copolymer, and tetrafluoroethylene/propylene copolymer because of their good heat resistance (heat-aging resistance) and oil resistance.

The fluororubber composition may further contain a cross-linking agent (C) and/or a cross-linking aid (D).

The cross-linked fluororubber layer preferably has an elongation at break of 140 to 700% and a tensile strength at break of 3 to 20 MPa each at 160° C. for improved characteristics required for a belt.

Further, the cross-linked fluororubber layer preferably has an elongation at break of 110 to 700% and a tensile strength at break of 2 to 20 MPa each at 200° C. for improved characteristics required for a belt.

Furthermore, the cross-linked fluororubber layer preferably has an elongation at break of 80 to 700% and a tensile strength at break of 1 to 20 MPa each at 230° C. for improved characteristics required for a belt.

The belt of the present invention may be suitably used as a timing belt and a conveyor belt for conveyance which are required to have, in particular, good mechanical properties under high-temperature conditions.

Effect of the Invention

The present invention provides a belt which is excellent in mechanical properties at high temperatures.

MODES FOR CARRYING OUT THE INVENTION

The present invention relates to a belt comprising a cross-linked fluororubber layer obtainable by cross-linking a fluororubber composition containing a fluororubber (A) and a carbon black (B), wherein the cross-linked fluororubber layer has a loss modulus E" of 400 kPa or higher and 6000 kPa or lower determined by a dynamic viscoelasticity test (measurement mode: tensile, chuck distance: 20 mm, measurement temperature: 160° C., tensile strain: 1%, initial force: 157 cN, frequency: 10 Hz).

Respective requirements will be described hereinbelow.

The fluororubber (A) in the present invention preferably has a structural unit derived from at least one monomer selected from tetrafluoroethylene (TFE), vinylidene fluoride (VdF), and perfluoroethylenic unsaturated compounds (e.g. hexafluoropropylene (HFP) and perfluoro(alkyl vinyl ether) (PAVE)) represented by formula (1):

$$CF_2=CF-R_f^a \quad (1)$$

wherein $R_f^a$ is $-CF_3$ or $-OR_f^b$ ($R_f^b$ is a C1-C5 perfluoroalkyl group).

In another aspect, the fluororubber (A) is preferably a non-perfluoro fluororubber or a perfluoro fluororubber.

Examples of the non-perfluoro fluororubber include: vinylidene fluoride (VdF) fluororubber; tetrafluoroethylene (TFE)/propylene (Pr) fluororubber; tetrafluoroethylene (TFE)/propylene (Pr)/vinylidene fluoride (VdF) fluororubber; ethylene (Et)/hexafluoropropylene (HFP) fluororubber; ethylene (Et)/hexafluoropropylene (HFP)/vinylidene fluoride (VdF) fluororubber; ethylene (Et)/hexafluoropropylene (HFP)/tetrafluoroethylene (TFE) fluororubber; fluorosilicone fluororubber; and fluorophosphazene fluororubber. Each of these may be used alone, or any of these may be used in combination to the extent that they do not deteriorate the effects of the present invention. More suitable among these is at least one selected from the group consisting of VdF fluororubber, TFE/Pr fluororubber, and TFE/Pr/VdF fluororubber because of their good heat-aging resistance and oil resistance.

The VdF rubber preferably has 20 mol % or more and 90 mol % or less, and more preferably 40 mol % or more and 85 mol % or less, of a VdF repeating unit in the total moles of the VdF repeating unit and repeating units derived from other comonomers. The lower limit thereof is further preferably 45 mol % and particularly preferably 50 mol %, while the upper limit thereof is further preferably 80 mol %.

The comonomers in the VdF rubber are not particularly limited as long as they are copolymerizable with VdF. Examples thereof include fluoromonomers such as TFE, HFP, PAVE, chlorotrifluoroethylene (CTFE), trifluoroethylene, trifluoropropylene, tetrafluoropropylene, pentafluoropropylene, trifluorobutene, tetrafluoroisobutene, hexafluoroisobutene, vinyl fluoride, iodine-containing fluorinated vinyl ether, and a fluorine-containing monomer (2) represented by formula (2):

$$CH_2=CFR_f \qquad (2)$$

wherein $R_f$ is a C1-C12 linear or branched fluoroalkyl group; fluorine-free monomers such as ethylene (Et), propylene (Pr), and alkyl vinyl ethers; monomers giving a cross-linkable group (a curing site); and a reactive emulsifier. Each of these monomers and compounds may be used alone, or two or more of these may be used in combination.

The PAVE is more preferably perfluoro(methyl vinyl ether) (PMVE) or perfluoro(propyl vinyl ether) (PPVE), and is particularly preferably PMVE.

The PAVE may be a perfluorovinylether represented by the formula:

$$CF_2=CFOCF_2OR_f^c$$

wherein $R_f^c$ is a C1-C6 linear or branched perfluoroalkyl group, a C5-C6 cyclic perfluoroalkyl group, or a C2-C6 linear or branched perfluorooxyalkyl group having 1 to 3 oxygen atoms. The PAVE is preferably $CF_2=CFOCF_2OCF_3$, $CF_2=CFOCF_2OCF_2CF_3$, or $CF_2=CFOCF_2OCF_2CF_2OCF_3$.

The fluorine-containing monomer (2) of formula (2) is preferably a monomer whose $R_f$ is a linear fluoroalkyl group, and more preferably a monomer whose $R_f$ is a linear perfluoroalkyl group. The carbon number of $R_f$ is preferably 1 to 6. Examples of the fluorine-containing monomer (2) of formula (2) include $CH_2=CFCF_3$, $CH_2=CFCF_2CF_3$, $CH_2=CFCF_2CF_2CF_3$, and $CH_2=CFCF_2CF_2CF_2CF_3$. Preferable among these is 2,3,3,3-tetrafluoropropylene represented as $CH_2=CFCF_3$.

The VdF rubber is preferably at least one copolymer selected from the group consisting of a VdF/HFP copolymer, VdF/TFE/HFP copolymer, VdF/CTFE copolymer, VdF/CTFE/TFE copolymer, VdF/PAVE copolymer, VdF/TFE/PAVE copolymer, VdF/HFP/PAVE copolymer, VdF/HFP/TFE/PAVE copolymer, VdF/TFE/propylene (Pr) copolymer, VdF/ethylene (Et)/HFP copolymer, and copolymer of VdF/fluorine-containing monomer (2) of formula (2). Further, the rubber is more preferably one having TFE, HFP, and/or PAVE as comonomers other than VdF. Preferable among these is at least one copolymer selected from the group consisting of a VdF/HFP copolymer, VdF/TFE/HFP copolymer, copolymer of VdF/fluorine-containing monomer (2) of formula (2), VdF/PAVE copolymer, VdF/TFE/PAVE copolymer, VdF/HFP/PAVE copolymer, and VdF/HFP/TFE/PAVE copolymer. More preferable among these is at least one copolymer selected from the group consisting of a VdF/HFP copolymer, VdF/HFP/TFE copolymer, copolymer of VdF/fluorine-containing monomer (2) of formula (2), and VdF/PAVE copolymer. Particularly preferable among these is at least one copolymer selected from the group consisting of a VdF/HFP copolymer, copolymer of VdF/fluorine-containing monomer (2) of formula (2), and VdF/PAVE copolymer.

In the VdF/HFP copolymer, the composition of VdF/HFP is preferably (45 to 85)/(55 to 15) (mol %), more preferably (50 to 80)/(50 to 20) (mol %), and further preferably (60 to 80)/(40 to 20) (mol %).

In the VdF/TFE/HFP copolymer, the composition of VdF/TFE/HFP is preferably (30 to 80)/(4 to 35)/(10 to 35) (mol %).

In the VdF/PAVE copolymer, the composition of VdF/PAVE is preferably (65 to 90)/(35 to 10) (mol %).

In the VdF/TFE/PAVE copolymer, the composition of VdF/TFE/PAVE is preferably (40 to 80)/(3 to 40)/(15 to 35) (mol %).

In the VdF/HFP/PAVE copolymer, the composition of VdF/HFP/PAVE is preferably (65 to 90)/(3 to 25)/(3 to 25) (mol %).

In the VdF/HFP/TFE/PAVE copolymer, the composition of VdF/HFP/TFE/PAVE is preferably (40 to 90)/(0 to 25)/(0 to 40)/(3 to 35) (mol %), and more preferably (40 to 80)/(3 to 25)/(3 to 40)/(3 to 25) (mol %).

In the copolymer based on VdF/fluorine-containing monomer (2) of formula (2), the mol % ratio of VdF/fluorine-containing monomer (2) units is preferably 85/15 to 20/80 and the amount of monomer units other than the VdF and fluorine-containing monomer (2) units is preferably 0 to 50 mol % in all of the monomer units; the mol % ratio of the VdF/fluorine-containing monomer (2) units is more preferably 80/20 to 20/80. The mol % ratio of the VdF/fluorine-containing monomer (2) units is also preferably 85/15 to 50/50, and the amount of monomer units other than the VdF and fluorine-containing monomer (2) units is also preferably 1 to 50 mol % in all of the monomer units. The monomers other than the VdF and fluorine-containing monomer (2) units are preferably the monomers listed above as the comonomers for VdF, that is, TFE, HFP, PMVE, perfluoroethyl vinyl ether (PEVE), PPVE, CTFE, trifluoroethylene, hexafluoroisobutene, vinyl fluoride, ethylene (Et), propylene (Pr), alkyl vinyl ether, monomers giving a cross-linkable group, and a reactive emulsifier. Preferable among these are PMVE, CTFE, HFP, and TFE.

The TFE/propylene (Pr) fluororubber is a fluorine-containing copolymer containing 45 to 70 mol % of TFE and 55 to 30 mol % of propylene (Pr). In addition to these two components, the rubber may further contain 0 to 40 mol % of a specific third component (e.g. PAVE).

In the ethylene (Et)/HFP fluororubber (copolymer), the composition of Et/HFP is preferably (35 to 80)/(65 to 20) (mol %), and more preferably (40 to 75)/(60 to 25) (mol %).

In the Et/HFP/TFE fluororubber (copolymer), the composition of Et/HFP/TFE is preferably (35 to 75)/(25 to 50)/(0 to 15) (mol %), and more preferably (45 to 75)/(25 to 45)/(0 to 10) (mol %).

Examples of the perfluoro fluororubber include those including TFE/PAVE. The composition of TFE/PAVE is preferably (50 to 90)/(50 to 10) (mol %), more preferably (50 to 80)/(50 to 20) (mol %), and further preferably (55 to 75)/(45 to 25) (mol %).

Examples of the PAVE in this case include PMVE and PPVE. Each of these may be used alone, or any of these may be used in combination.

The fluororubber preferably has a number average molecular weight of 5,000 to 500,000, more preferably 10,000 to 500,000, and particularly preferably 20,000 to 500,000.

From the viewpoint of processability, the fluororubber (A) preferably has a Mooney viscosity at 100° C. of within a range of 20 to 200, and further preferably 30 to 180. The Mooney viscosity is measured in accordance with ASTM-D1646 and JIS K 6300.

The above-described non-perfluo fluororubber and perfluoro fluororubber may be produced by a common method such as emulsion polymerization, suspension polymerization, or solution polymerization. In particular, a polymerization method using an iodine (bromine) compound, which is known as iodine (bromine) transfer polymerization, can provide a fluororubber having a narrow molecular weight distribution.

In order to provide a fluororubber composition having a low viscosity, for example, other species of fluororubbers may be blended with the fluororubber (A). Examples of other fluororubbers include low molecular weight liquid fluororubber (number average molecular weight: 1,000 or more), low molecular weight fluororubber having a number average molecular weight of about 10,000, and fluororubber having a number average molecular weight of about 100,000 to about 200,000.

The listed monomers in the above non-perfluoro fluororubber and perfluoro fluororubber are examples of the main monomers of the rubber, and the main monomers may be suitably copolymerized with monomers giving a cross-linkable group. The monomer giving a cross-linkable group may be any monomer which can provide a suitable cross-linkable group depending on a production method and cross-link system. Examples thereof include known polymerizable compounds and chain transfer agents having an iodine atom, bromine atom, carbon-carbon double bond, cyano group, carboxyl group, hydroxy group, amino group, ester group, and the like.

Examples of the monomer giving a preferable cross-linkable group include a compound represented by formula (3):

$$CY^1{}_2\!=\!CY^2R_f{}^2X^1 \tag{3}$$

wherein $Y^1$ and $Y^2$ each are a fluorine atom, hydrogen atom, or —$CH_3$; $R_f{}^2$ is a linear or branched fluoroalkylene group which may have one or more ethereal oxygen atoms and which may have one or more aromatic rings, and in which part or all of the hydrogen atoms are replaced by fluorine atoms; $X^1$ is an iodine atom or a bromine atom.

Specific examples thereof include: iodine-containing monomers and bromine-containing monomers represented by formula (4):

$$CY^1{}_2\!=\!CY^2R_f{}^3CHR^1\!-\!X^1 \tag{4}$$

wherein $Y^2$, $Y^2$, and $X^2$ each are the same as defined above; $R_f{}^3$ is a linear or branched fluoroalkylene group which may have one or more ethereal oxygen atoms and in which part or all of the hydrogen atoms are replaced by fluorine atoms, in other words, $R_f{}^3$ is a linear or branched fluorine-containing alkylene group in which part or all of the hydrogen atoms are replaced by fluorine atoms, a linear or branched fluorine-containing oxyalkylene group in which part or all of the hydrogen atoms are replaced by fluorine atoms, or linear or branched fluorine-containing polyoxyalkylene group in which part or all of the hydrogen atoms are replaced by fluorine atoms; $R^1$ is a hydrogen atom or a methyl group; and iodine-containing monomers and bromine-containing monomers represented by formulas (5) to (22):

$$CY^4{}_2\!=\!CY^4(CF_2)_n\!-\!X^1 \tag{5}$$

wherein $Y^4$s may be the same as or different from each other, and each of these is a hydrogen atom or a fluorine atom; n is an integer of 1 to 8, $$CF_2\!=\!CFCF_2R_f{}^4\!-\!X^1 \tag{6}$$

wherein $$R_f{}^4 \text{ is } \!-\!(OCF_2)\!-\!{}_n, \!-\!(OCF(CF_3))\!-\!{}_n;$$

n is an integer of 0 to 5;

$$CF_2\!=\!CFCF_2(OCF(CF_3)CF_2)_m(OCH_2CF_2CF_2)_nOCH_2CF_2\!-\!X^1 \tag{7}$$

wherein m is an integer of 0 to 5; n is an integer of 0 to 5;

$$CF_2\!=\!CFCF_2(OCH_2CF_2CF_2)_m(OCF(CF_3)CF_2)_nOCF(CF_3)\!-\!X^1 \tag{8}$$

wherein m is an integer of 0 to 5; n is an integer of 0 to 5;

$$CF_2\!=\!CF(OCF_2CF(CF_2))_mO(CF_2)_{12}\!-\!X^1 \tag{9}$$

wherein m is an integer of 0 to 5; n is an integer of 1 to 8;

$$CF_2\!=\!CF(OCF_2CF(CF_2))_m\!-\!X^1 \tag{10}$$

wherein m is an integer of 1 to 5;

$$CF_2\!=\!CFOCF_2(CF(CF_2)OCF_2)_nCF(\!-\!X^1)CF_2 \tag{11}$$

wherein n is an integer of 1 to 4;

$$CF_2\!=\!CFO(CF_2)_nOCF(CF_3)\!-\!X^1 \tag{12}$$

wherein n is an integer of 2 to 5;

$$CF_2\!=\!CFO(CF_2)_n\!-\!(C_6H_4)\!-\!X^1 \tag{13}$$

wherein n is an integer of 1 to 6;

$$CF_2\!=\!CF(OCF_2CF(CF_3))_nOCF_2CF(CF_3)\!-\!X^1 \tag{14}$$

wherein n is an integer of 1 to 2;

$$CH_2\!=\!CFCF_2O(CF(CF_2)CF_2O)_nCF(CF_2)\!-\!X^1 \tag{15}$$

wherein n is an integer of 0 to 5;

$$CF_2\!=\!CFO(CF_2CF(CF_2)O)_m(CF_2)_n\!-\!X^1 \tag{16}$$

wherein m is an integer of 0 to 5; n is an integer of 1 to 3;

$$CH_2\!=\!CFCF_2OCF(CF_2)OCF(CF_3)\!-\!X^1 \tag{17}$$

$$CH_2\!=\!CFCF_2OCH_2CF_2\!-\!X^1 \tag{18}$$

$$CF_2\!=\!CFO(CF_2CF(CF_2)O)_mCF_2CF(CF_2)\!-\!X^1 \tag{19}$$

wherein m is an integer of 0 or greater;

$$CF_2\!=\!CFOCF(CF_2)CF_2O(CF_2)_n\!-\!X^1 \tag{20}$$

wherein n is an integer of 1 or greater;

$$CF_2\!=\!CFOCF_2OCF_2CF(CF_2)OCF_2\!-\!X^1 \tag{21}$$

$$CH_2\!=\!CH\!-\!(CF_2)_nX^1 \tag{22}$$

wherein n is an integer of 2 to 8;
in formulas (5) to (22), $X^1$ is the same as defined above. Each of these may be used alone, or any of these may be used in combination.

The iodine-containing monomer or the bromine-containing monomer represented by formula (4) is preferably an iodine-containing fluorinated vinyl ether represented by formula (23):

$$I(CH_2CF_2CF_2O)_m(CFCF_2O)_n\overset{\underset{\mid}{CF_3}}{C}F\!=\!CF_2 \quad (23)$$

wherein m is an integer of 1 to 5; n is an integer of 0 to 3. More specific examples thereof include those represented as follows.

$$ICH_2CF_2CF_2OCF\!=\!CF_2, I(CH_2CF_2CF_2O)_2CF\!=\!CF_2,$$

$$I(CH_2CF_2CF_2O)_3CF\!=\!CF_2,$$

$$ICH_2CF_2CF_2O\overset{\underset{\mid}{CF_3}}{C}FCF_2OCF\!=\!CF_2,$$
$$ICH_2CF_2CF_2O(\overset{\underset{\mid}{CF_3}}{C}FCF_2O)_2CF\!=\!CF_2$$

Preferable among these is $ICH_2CF_2CF_2OCF\!=\!CF_2$.

More specifically, preferable examples of the iodine-containing monomer and the bromine-containing monomer represented by formula (5) include $ICF_2CF_2CF\!=\!CH_2$ and $I(CF_2CF_2)_2CF\!=\!CH_2$.

More specifically, preferable examples of the iodine-containing monomer and the bromine-containing monomer represented by formula (9) include $I(CF_2CF_2)_2OCF\!=\!CF_2$.

More specifically, preferable examples of the iodine-containing monomer and the bromine-containing monomer represented by formula (22) include $CH_2\!=\!CHCF_2CF_2I$ and $I(CF_2CF_2)_2CH\!=\!CH_2$.

Further, a bisolefin compound represented by formula:

$$R^2R^3C\!=\!CR^4\!-\!Z\!-\!CR^5\!=\!CR^6R^7$$

wherein $R^2$, $R^3$, $R^4$, $R^5$, $R^6$, and $R^7$ may be the same as or different from each other, and each of these is H or a C1-C5 alkyl group; Z is a C1-C18 linear or branched alkylene group or cycloalkylene group which may have an oxygen atom and which is preferably at least partially fluorinated, or a (per) fluoropolyoxyalkylene group, is also preferable as a monomer giving a cross-linkable group. The term "(per)fluoropolyoxyalkylene group" herein means a fluoropolyoxyalkylene group or a perfluoropolyoxyalkylene group.

Z is preferably a C4-C12 (per) fluoroalkylene group; $R^2$, $R^3$, $R^4$, $R^5$, $R^6$, and $R^7$ each are preferably a hydrogen atom.

In the case that Z is a (per) fluoropolyoxyalkylene group, it is preferably a (per)fluoropolyoxyalkylene group represented by formula:

$$-(Q)_p\text{-}CF_2O\!-\!(CF_2CF_2O)_m\!-\!(CF_2O)_n\!-\!CF_2\text{-}(Q)_p\text{-}$$

wherein Q is a $C_1$-$C_{10}$ alkylene group or a $C_2$-$C_{10}$ oxyalkylene group; p is 0 or 1; m and n are integers which give an m/n ratio of 0.2 to 5 and a molecular weight of the (per) fluoropolyoxyalkylene group of 500 to 10,000, and preferably 1,000 to 4,000. In this formula, Q is preferably selected from $-CH_2OCH_2-$ and $-CH_2-O-(CH_2CH_2O)_sCH_2-$ wherein s=1 to 3.

Preferable examples of the bisolefin include $CH_2\!=\!CH-(CF_2)_4-CH\!=\!CH_2$, $CH_2\!=\!CH-(CF_2)_6-CH\!=\!CH_2$, and those represented by formula:

$$CH_2\!=\!CH\!-\!Z^1\!-\!CH\!=\!CH_2$$

wherein $Z^1$ is $-CH_2OCH_2-CF_2O-(CF_2CF_2O)_m-(CF_2O)_n-CF_2-CH_2OCH_2-$, wherein m/n is 0.5.

Preferable among these is 3,3,4,4,5,5,6,6,7,7,8,8-dodecafluoro-1,9-decadiene represented as $CH_2\!=\!CH-(CF_2)_6-CH\!=\!CH_2$.

In the present invention, the carbon black (B) is not particularly limited as long as it is a carbon black providing the loss modulus E" in the above range and further preferably the storage modulus E' in the above range.

Examples of such a carbon black include furnace black, acetylene black, thermal black, channel black, and graphite. Specific examples thereof include SAF-HS($N_2SA$: 142 $m^2/g$, DBP: 130 ml/100 g), SAF ($N_2SA$: 142 $m^2/g$, DBP: 115 ml/100 g), N234 ($N_2SA$: 126 $m^2/g$, DBP: 125 ml/100 g), ISAF ($N_2SA$: 119 $m^2/g$, DBP: 114 ml/100 g), ISAF-LS ($N_2SA$: 106 $m^2/g$, DBP: 75 ml/100 g), ISAF-HS ($N_2SA$: 99 $m^2/g$, DBP: 129 ml/100 g), N339 ($N_2SA$: 93 $m^2/g$, DBP: 119 ml/100 g), HAF-LS ($N_2SA$: 84 $m^2/g$, DBP: 75 ml/100 g), HAS-HS ($N_2SA$: 82 $m^2/g$, DBP: 126 ml/100 g), HAF ($N_2SA$: 79 $m^2/g$, DBP: 101 ml/100 g), N351 ($N_2SA$: 74 $m^2/g$, DBP: 127 ml/100 g), LI-HAF ($N_2SA$: 74 $m^2/g$, DBP: 101 ml/100 g), MAF-HS($N_2SA$: 56 $m^2/g$, DBP: 158 ml/100 g), MAF ($N_2SA$: 49 $m^2/g$, DBP: 133 ml/100 g), FEF-HS($N_2SA$: 42 $m^2/g$, DBP: 160 ml/100 g), FEF ($N_2SA$: 42 $m^2/g$, DBP: 115 ml/100 g), SRF-HS ($N_2SA$: 32 $m^2/g$, DBP: 140 ml/100 g), SRF-HS($N_2SA$: 29 $m^2/g$, DBP: 152 ml/100 g), GPF ($N_2SA$: 27 $m^2/g$, DBP: 87 ml/100 g), SRF ($N_2SA$: 27 $m^2/g$, DBP: 68 ml/100 g), SRF-LS ($N_2SA$: 23 $m^2/g$, DBP: 51 ml/100 g), FT ($N_2SA$: 19 $m^2/g$, DBP: 42 ml/100 g), and MT ($N_2SA$: 8 $m^2/g$, DBP: 43 ml/100 g). Each of these carbon blacks may be used alone, or two or more of these may be used in combination.

Particularly preferable as the carbon black is a carbon black having a nitrogen adsorption specific surface area ($N_2SA$) of 5 to 180 $m^2/g$ and a dibutyl phthalate (DBP) oil absorption of 40 to 180 ml/100 g.

If the nitrogen adsorption specific surface area ($N_2SA$) is smaller than 5 $m^2/g$, the mechanical properties of rubber tend to be poor in the case that the carbon black is mixed into the rubber. From this viewpoint, the nitrogen adsorption specific surface area ($N_2SA$) is preferably 10 $m^2/g$ or larger, more preferably 20 $m^2/g$ or larger, particularly preferably 30 $m^2/g$ or larger, and most preferably 40 $m^2/g$ or larger. The upper limit thereof is preferably 180 $m^2/g$ because of easy availability in general.

If the dibutyl phthalate (DBP) oil absorption is smaller than 40 ml/100 g, the mechanical properties of rubber tend to be poor in the case that the carbon black is mixed into the rubber. From this viewpoint, the DBP oil absorption is preferably 50 ml/100 g or higher, further preferably 60 ml/100 g or higher, and particularly preferably 70 ml/100 g or higher. The upper limit thereof is preferably 175 ml/100 g, and further preferably 170 ml/100 g because of easy availability in general.

The amount of the carbon black (B) is preferably 5 to 50 parts by mass to 100 parts by mass of the fluororubber (A). Too large an amount of the carbon black (B) tends to cause poor mechanical properties of a cross-linked product and tends to make the cross-linked product too hard. In contrast, too small an amount of the carbon black (B) tends to cause poor mechanical properties. For good balance of physical properties, the amount thereof is preferably 6 parts by mass or more, and more preferably 10 parts by mass or more, to 100 parts by mass of the fluororubber (A). For good balance of physical properties, the amount there of is preferably 49 parts by mass or less and, in particular, more preferably 45 parts by mass or less.

In order to obtain the cross-linked fluororubber layer of the present invention, a fluororubber composition is suitably used that has a difference δG' (G' (1%)–G'(100%)) between the shear modulus G' (1%) at 1% dynamic strain and the shear modulus G' (100%) at 100% dynamic strain of 120 kPa or higher and 3,000 kPa or lower determined by a dynamic viscoelasticity test (measurement temperature: 100° C., measurement frequency: 1 Hz) with a rubber process analyzer (RPA) before cross-linked.

The difference δG' is used as a standard for evaluating the property of reinforcement of the rubber composition, and it is determined by a dynamic viscoelasticity test with a rubber process analyzer.

The fluororubber composition having a difference δG' in the range of 120 kPa or higher and 3,000 kPa or lower is advantageous for good normal state at room temperature, mechanical properties at high temperatures, and the like.

The difference δG' is preferably 150 or higher, and further preferably 160 or higher, for good normal state at room temperature, mechanical properties at high temperatures, and the like. In contrast, it is preferably 2,800 or lower, and further preferably 2,500 or lower, for good normal state at room temperature, mechanical properties at high temperatures, and the like.

The fluororubber composition having a difference δG' of 120 kPa or higher and 3,000 kPa or lower may be prepared using a mixer or a roll mixer, for example.

More specifically, the following methods may be adopted; the method is not limited to these methods.

(1) A method in which predetermined amounts of a fluororubber (A) and a carbon black (B), and if necessary the below-mentioned organic amine compound and/or acid acceptor, are charged into an internal mixer, and then mixed at an average shear rate of a rotor of 50 to 1,000 (1/second), preferably 100 to 1,000 (1/second), and further preferably 200 to 1,000 (1/second) so that the highest mixing temperature Tm is 80° C. to 220° C. (preferably 120° C. to 200° C.) (in other words, the highest temperature Tm of the mixed product upon mixing is preferably 80° C. to 220° C., and the highest temperature of the mixed product upon discharging is also preferably in the same range. The same applies below). Examples of the internal mixer include a pressurizing kneader, Banbury mixer, single screw mixer, and twin screw mixer.

(2) A method in which predetermined amounts of a fluororubber (A) and a carbon black (B), and if necessary the below-mentioned organic amine compound and/or acid acceptor, are charged into a roll mixer, and then mixed under the conditions that the average shear rate of a rotor is 50 (1/second) or higher and the highest mixing temperature Tm is to be 80° C. to 220° C. (preferably, 120° C. to 200° C.)

The fluororubber compositions obtained by the above methods (1) and (2) are free from components such as a cross-linking agent (and/or a cross-linking aid (D)) and a cross-linking accelerator. Further, the mixing of the methods (1) and (2) may be performed multiple times. In the case of performing the mixing multiple times, the mixing conditions of the second and further subsequent mixing may be the same as those in the methods (1) and (2) except that the highest temperature Tm upon mixing is 140° C. or lower.

One example of the method for preparing a cross-linkable fluororubber composition used in the present invention is a method in which the fluororubber composition obtained in the method (1) or (2), or obtained by repeating the method (1) or (2) multiple times, is further blend-mixed with a cross-linking agent (C) (and/or a cross-linking aid (D)) and a cross-linking accelerator.

The cross-linking agent (C) (and/or the cross-linking aid (D)) and the cross-linking accelerator may be blend-mixed at the same time, or the cross-linking accelerator may be first blend-mixed and then the cross-linking agent (C) (and/or the cross-linking aid (D)) may be blend-mixed. The conditions for mixing the cross-linking agent (C) (and/or the cross-linking aid (D)) and the cross-linking accelerator may be the same as those in the methods (1) and (2) except that the highest mixing temperature Tm is 130° C. or lower.

Another example of the method for preparing a cross-linkable fluororubber composition is a method in which predetermined amounts of a fluororubber (A), carbon black (B), cross-linking agent (C) (and/or cross-linking aid (D)), and cross-linking accelerator are charged into a roll mixer in an appropriate order, and then mixed under the conditions that the average shear rate of a rotor is 50 (1/second) or higher and the highest mixing temperature Tm is 130° C. or lower.

In the case of the polyol cross-link system, the fluororubber (A), the cross-linking agent (C), and a cross-linking accelerator may be preliminarily mixed to prepare a uniform dispersion, and this uniform dispersion may be used. For example, the fluororubber (A), a polyol cross-linking agent, and a cross-linking accelerator are first mixed, and then a carbon black and the below-mentioned organic amine compound are mixed thereinto. The mixture is mixed at the highest temperature Tm upon mixing of 80 to 220° C. Finally, an acid acceptor is mixed therewith at the highest temperature Tm upon mixing is 130° C. or lower. Upon mixing, a more preferable is one in which mixing is performed at an average shear rate of 50 (1/second) or higher.

The range of the difference δG' is preferably satisfied in the fluororubber composition before mixed with a cross-linking agent (C) and/or a cross-linking aid (D), and a cross-linking accelerator. Further, the difference δG' is also preferably within the above range even in the fluororubber composition containing a cross-linking agent (C) and/or a cross-linking aid (D), and a cross-linking accelerator.

In order to obtain a fluororubber layer having the aforementioned specific loss modulus E" and storage modulus E', the average shear rate is preferably 50 (1/second) or higher. An average shear rate of 50 (1/second) or higher provides desired normal state at room temperature and mechanical properties at high temperatures.

The average shear rate (1/second) is calculated by the following formula.

$$\text{Average shear rate (1/second)} = (\pi \times D \times R)/(60 \text{ (seconds)} \times c)$$

wherein

D: rotor diameter or roll diameter (cm)

R: rotation rate (rpm)

c: tip clearance (cm, gap distance between rotor and casing or gap distance between rolls)

The cross-linking agent (C) and/or the cross-linking aid (D), and the cross-linking accelerator may be appropriately selected depending on the cross-link system, the type of the fluororubber (A) to be cross-linked (e.g. composition of copolymerization, presence of a cross-linkable group and the type thereof), the specific applications and the modes of a belt to be used, the mixing conditions, and the like.

In the present invention, the cross-linking aid (D) is a compound which triggers a cross-linking reaction in the below-mentioned triazine cross-link system, or a compound which accelerates a cross-linking reaction in the oxazole cross-link system, thiazole cross-link system, or imidazole cross-link system.

Examples of the cross-link system include a peroxide cross-link system, polyol cross-link system, polyamine cross-link system, oxazole cross-link system, thiazole cross-link system, imidazole cross-link system, and triazine cross-link system.

(Peroxide Cross-link System)

In the case that cross-linking is performed by the peroxide cross-link system, the cross-linking site has a carbon-carbon bond; thus, the system is superior in chemical resistance and steam resistance compared with the polyol cross-link system in which the cross-linking site has a carbon-oxygen bond and the polyamine cross-link system in which the cross-linking site has a carbon-nitrogen double bond.

The cross-linking agent (C) is preferably a cross-linking agent of the peroxide cross-link system. The cross-linking agent of the peroxide cross-link system may be any peroxide capable of easily generating a peroxy radical in the presence of heat or a redox system. Specific examples thereof include organic peroxides such as 1,1-bis(t-butylperoxy)-3,5,5-trimethylcyclohexane, 2,5-dimethylhexane-2,5-dihydroperoxide, di-t-butyl peroxide, t-butylcumyl peroxide, dicumyl peroxide, α,α-bis(t-butylperoxy)-p-diisopropylbenzene, α,α-bis(t-butylperoxy)-m-diisopropylbenzene, α,α-bis(t-butylperoxy)-m-diisopropylbenzene, 2,5-dimethyl-2,5-di(t-butylperoxy)hexane, 2,5-dimethyl-2,5-di(t-butylperoxy)-hexyne-3, benzoyl peroxide, t-butylperoxybenzene, t-butylperoxybenzoate, t-butylperoxy maleic acid, and t-butylperoxyisopropyl carbonate. Preferable among these is 2,5-dimethyl-2,5-di(t-butylperoxy)hexane or 2,5-dimethyl-2,5-di(t-butylperoxy)-hexyne-3.

Further, in the peroxide cross-link system, it is preferable to use a cross-linking accelerator, in general. Examples of the cross-linking accelerator for peroxide cross-linking agents, especially organoperoxide cross-linking agents, include triallyl cyanurate, triallyl isocyanurate (TAIC), triacryl formal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, triallyl phosphite, N,N-diallylacrylamide, 1,6-divinyldodecafluorohexane, hexaallyl phosphoramide, N,N,N',N'-tetraallyl phthalamide, N,N,N',N'-tetraallyl malonamide, trivinyl isocyanurate, 2,4,6-trivinyl methyltrisiloxane, tri(5-norbornene-2-methylene)cyanurate, and triallyl phosphite. Preferable among these is triallyl isocyanurate (TAIC) from the viewpoints of its cross-linkability and physical properties of cross-linked products.

A perfluoro fluororubber and a non-perfluoro fluororubber having at least a TFE unit, a VdF unit, or a fluorine-containing monomer unit of formula (1) may be suitably used as the fluororubber (A) for the peroxide cross-link system. Particularly preferable is at least one rubber selected from VdF rubbers and TFE/Pr rubbers.

From the viewpoint of cross-linkability, the fluororubber (A) suitable for the peroxide cross-link system is preferably a fluororubber having an iodine atom and/or a bromine atom as a cross-linking site. For good balance of physical properties, the amount of an iodine atom and/or a bromine atom is preferably 0.001 to 10% by mass, further preferably 0.01 to 5% by mass, and particularly preferably 0.1 to 3% by mass.

The amount of the peroxide cross-linking agent is preferably 0.01 to 10 parts by mass, more preferably 0.1 to 9 parts by mass, and particularly preferably 0.2 to 8 parts by mass, to 100 parts by mass of the fluororubber (A). If the amount of the peroxide cross-linking agent is less than 0.01 parts by mass, cross-linking of the fluororubber (A) tends to insufficiently proceed. In contrast, if the amount thereof is more than 10 parts by mass, balance of physical properties tends to be poor.

Further, the amount of the cross-linking accelerator is generally 0.01 to 10 parts by mass, and preferably 0.1 to 9 parts by mass, relative to 100 parts by mass of the fluororubber (A). If the amount of the cross-linking accelerator is less than 0.01 parts by mass, cross-linking tends to take too long a time which may be impractical. In contrast, if the amount thereof is more than 10 parts by mass, cross-linking tends to proceed too rapidly, as well as cause poor balance of physical properties.

(Polyol Cross-link System)

In the case of cross-linking by the polyol cross-link system, the cross-linking site has a carbon-oxygen bond, compression set is low, and formability is excellent. Therefore, this cross-link system is preferable.

The polyol cross-linking agent may be a compound conventionally known as a cross-linking agent for fluororubber. Suitably used is a polyhydroxy compound, especially a polyhydroxyaromatic compound, for example, because of its excellent heat resistance.

The polyhydroxyaromatic compound is not particularly limited. Examples thereof include 2,2-bis(4-hydroxyphenyl) propane (hereinafter referred to as bisphenol A), 2,2-bis(4-hydroxyphenyl)perfluoropropane (hereinafter referred to as bisphenol AF), resorcin, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (hereinafter referred to as bisphenol B), 4,4-bis(4-hydroxyphenyl)valerate, 2,2-bis(4-hydroxyphenyl)tetrafluorodichloropropane, 4,4'-dihydroxydiphenylsulfone, 4,4'-dihydroxydiphenylketone, tri(4-hydroxyphenyl)methane, 3,3',5,5'-tetrachlorobisphenol A, and 3,3',5,5'-tetrabromobisphenol A. These polyhydroxyaromatic compounds may be alkaline metal salts or alkaline earth metal salts; in the case of coagulating copolymers using an acid, it is preferable not to use the metal salts.

Of these compounds, polyhydroxy compounds are preferable because of a low compression set of a formed product to be obtained and excellent formability; polyhydroxyaromatic compounds are more preferable because of excellent heat resistance; and bisphenol AF is further preferable.

Further, in the polyol cross-link system, it is preferable to use a cross-linking accelerator, in general. A cross-linking accelerator accelerates generation of double bonds in molecules in defluorination reaction of the main chain of the fluororubber and addition of the polyhydroxy compound to the generated double bonds, so that the cross-linking reaction is accelerated.

A generally used cross-linking accelerator for the polyol cross-link system is an onium compound. The onium compound is not particularly limited. Examples thereof include ammonium compounds such as quaternary ammonium salts, phosphonium compounds such as quaternary phosphonium salts, oxonium compounds, sulfonium compounds, cyclic amines, and monofunctional amine compounds. Preferable among these are quaternary ammonium salts and quaternary phosphonium salts.

The quaternary ammonium salts are not particularly limited. Examples thereof include 8-methyl-1,8-diazabicyclo[5,4,0]-7-undecenium chloride, 8-methyl-1,8-diazabicyclo[5,4,0]-7-undecenium iodide, 8-methyl-1,8-diazabicyclo[5,4,0]-7-undecenium hydroxide, 8-methyl-1,8-diazabicyclo[5,4,0]-

7-undecenium methylsulfate, 8-ethyl-1,8-diazabicyclo[5,4,0]-7-undecenium bromide, 8-propyl-1,8-diazabicyclo[5,4,0]-7-undecenium bromide, 8-dodecyl-1,8-diazabicyclo[5,4,0]-7-undecenium chloride, 8-dodecyl-1,8-diazabicyclo[5,4,0]-7-undecenium hydroxide, 8-eicosyl-1,8-diazabicyclo[5,4,0]-7-undecenium chloride, 8-tetracosyl-1,8-diazabicyclo[5,4,0]-7-undecenium chloride, 8-benzyl-1,8-diazabicyclo[5,4,0]-7-undecenium chloride (hereinafter referred to as DBU-B), 8-benzyl-1,8-diazabicyclo[5,4,0]-7-undecenium hydroxide, 8-phenethyl-1,8-diazabicyclo[5,4,0]-7-undecenium chloride, and 8-(3-phenylpropyl)-1,8-diazabicyclo[5,4,0]-7-undecenium chloride. Preferable among these is DBU-B because of its cross-linkability and physical properties of a cross-linked product.

The quaternary phosphonium salts are not particularly limited. Examples thereof include tetrabutylphosphonium chloride, benzyltriphenylphosphonium chloride (hereinafter referred to as BTPPC), benzyltrimethylphosphonium chloride, benzyltributylphosphonium chloride, tributylallylphosphonium chloride, tributyl-2-methoxypropylphosphonium chloride, and benzylphenyl(dimethylamino)phosphonium chloride. Preferable among these is benzyltriphenylphosphonium chloride (BTPPC) because of its cross-linkability and physical properties of a cross-linked product.

In addition, a solid solution of a quaternary ammonium salt or a quaternary phosphonium salt and bisphenol AF, or a chlorine-free cross-linking accelerator disclosed in JP 11-147891 A may be used as a cross-linking accelerator.

Any perfluoro fluororubber or non-perfluoro fluororubber having at least a TFE unit, a VdF unit, or a fluorine-containing monomer unit of formula (1) may be suitably used as the fluororubber (A) for the polyol cross-link system. Particularly preferable is at least one rubber selected from VdF rubbers and TFE/Pr rubbers.

The amount of the polyol cross-linking agent is preferably 0.01 to 10 parts by mass, and more preferably 0.1 to 7 parts by mass, relative to 100 parts by mass of the fluororubber (A). If the amount of the polyol cross-linking agent is less than 0.01 parts by mass, the fluororubber (A) tends to be insufficiently cross-linked, while if the amount thereof is more than 10 parts by mass, the balance of physical properties tends to be poor.

The amount of the cross-linking accelerator is preferably 0.01 to 8 parts by mass, and more preferably 0.02 to 5 parts by mass, to 100 parts by mass of the fluororubber (A). If the amount of the cross-linking accelerator is less than 0.01 parts by mass, cross-linking of the fluororubber (A) tends to insufficiently proceed. In contrast, if the amount thereof is more than 8 parts by mass, the balance of physical properties tends to be poor.

(Polyamine Cross-link System)

In the case of polyamine cross-linking, the cross-linking site has a carbon-nitrogen double bond and dynamic mechanical properties are excellent. However, the compression set tends to be high in comparison with the case of cross-linking using a polyol cross-linking or peroxide cross-linking agent.

Examples of the polyamine cross-linking agent include polyamine compounds such as hexamethylenediamine carbamate, N,N'-dicinnamylidene-1,6-hexamethylenediamine, and 4,4'-bis(aminocyclohexyl)methane carbamate. Preferable among these is N,N'-dicinnamylidene-1,6-hexamethylenediamine.

Any perfluoro fluororubber or non-perfluoro fluororubber at least having a TFE unit, a VdF unit, or a fluorine-containing monomer unit of formula (1) may be used as the fluororubber (A) suitable for the polyamine cross-link system. In particular, a VdF rubber or a TFE/Pr rubber is preferable.

The amount of the polyamine cross-linking agent is preferably 0.01 to 10 parts by mass, and more preferably 0.2 to 7 parts by mass, to 100 parts by mass of the fluororubber (A). If the amount of the polyamine cross-linking agent is less than 0.01 parts by mass, cross-linking of the fluororubber (A) tends to insufficiently proceed. In contrast, if the amount thereof is more than 10 parts by mass, the balance of physical properties tends to be poor.

(Oxazole Cross-link System, Thiazole Cross-link System, and Imidazole Cross-link System)

The oxazole cross-link system, thiazole cross-link system, and imidazole cross-link system are cross-link systems with a low compression set and excellent heat resistance.

Examples of the cross-linking agent used in the oxazole cross-link system, thiazole cross-link system, and imidazole cross-link system include:

compounds having at least two cross-linkable reaction groups represented by formula (24):

wherein $R^1$s may be the same as or different from each other and each are $-NH_2$, $-NHR^2$, $-OH$, or $-SH$; $R^2$ is a fluorine atom or a monovalent organic group;

compounds represented by formula (25):

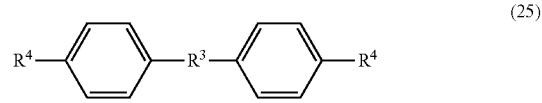

wherein $R^3$ is $-SO_2-$, $-O-$, $-CO-$, a C1-C6 alkylene group, a C1-C10 perfluoroalkylene group, or a single bond; and

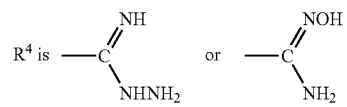

compounds represented by formula (26):

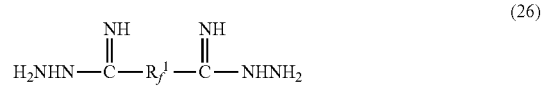

wherein $R_f^1$ is a C1-C10 perfluoroalkylene group; and compounds represented by formula (27):

wherein n is an integer of 1 to 10.

Specific examples of the cross-linking agent include:
compounds each of which has two cross-linkable reaction groups represented by formula (24) and each of which is represented by formula (28):

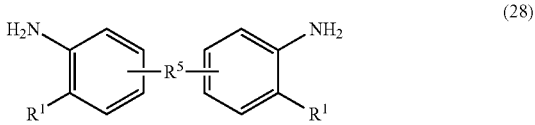

(28)

wherein $R^1$ is as defined above; $R^5$ is —$SO_2$—, —O—, —CO—, a $C_1$-$C_6$ alkylene group, a C1-C10 perfluoroalkylene group, a single free bond, or a group represented by formula:

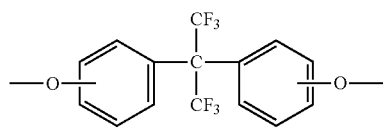

2,2-bis(3-amino-4-hydroxyphenyl)hexafluoropropane, 2,2-bis(3-amino-4-mercaptophenyl)hexafluoropropane, 2,2-bis(3,4-diaminophenyl)hexafluoropropane, and compounds represented by formula (29):

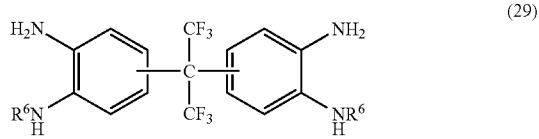

(29)

wherein $R^6$s are the same as or different from each other and each of these is a C1-C10 alkyl group; a C1-C10 alkyl group having a fluorine atom; a phenyl group; a benzyl group; or a phenyl group or a benzyl group in which 1 to 5 hydrogen atoms are replaced by a fluorine atom and/or —$CF_3$.

Non-limitative specific examples thereof include bisaminophenol cross-linking agents such as 2,2-bis(3,4-diaminophenyl)hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-phenylamino)phenyl]hexafluoropropane, 2,2-bis[3-amino-4-(N-perfluorophenylamino)phenyl]hexafluoro propane, and 2,2-bis[3-amino-4-(N-benzylamino)phenyl]hexafluoropropane.

Further preferable among the above cross-linking agents are 2,2-bis(3-amino-4-hydroxyphenyl)hexafluoropropane (OH-AF), 2,2-bis[3-amino-4-(N-phenylamino)phenyl] hexafluoropropane(N ph-AF), and 2,2-bis(3,4-diaminophenyl)hexafluoropropane(TA-AF) because of excellent heat resistance and particularly good cross-linking reactivity.

In these oxazole cross-link system, thiazole cross-link system, and imidazole cross-link system, a cross-linking aid (D) may be used in combination for greatly increased cross-linking rate.

Examples of the cross-linking aid (D) combination-used in the oxazole cross-link system, thiazole cross-link system, and imidazole cross-link system include (D1) compounds generating ammonia at 40° C. to 330° C. and (D2) particulate inorganic nitride.

(D1) Compounds Generating Ammonia at 40° C. to 330° C. (Ammonia-generating Compounds)

The ammonia-generating compound (D1) leads to curing as ammonia generated at cross-linking reaction temperature (40° C. to 330° C.) causes cross-linking, and also accelerates curing by a cross-linking agent. There are compounds which react with a slight amount of water to generate ammonia.

Preferable examples of the ammonia-generating compound (D1) include urea or derivatives thereof or ammonium salts. More preferable examples of the ammonia-generating compound (D1) include urea or ammonium salts.

The derivatives of urea includes urea, as well as urea derivatives such as biurea, thiourea, urea hydrochlorides, and biuret.

Examples of the organic ammonium salt include compounds disclosed in JP 9-111081 A, WO 00/09603, and WO 98/23675, such as ammonium salts of polyfluorocarboxylic acids e.g. ammonium perfluorohexanoate and ammonium perfluorooctanoate; ammonium salts of polyfluorosulfonic acids e.g. ammonium perfluorohexanesulfonate and ammonium perfluorooctanesulfonate; ammonium salts of polyfluoroalkyl group-containing phosphoric acids and phosphoric acids e.g. ammonium perfluorohexanephosphate and ammonium perfluorooctanephosphate; and ammonium salts of non-fluorocarboxylic acids and sulfonic acids e.g. ammonium benzoate, ammonium adipate, and ammonium phthalate.

Preferable among these are ammonium salts of fluorocarboxylic acids, fluorosulfonic acids, and fluorophosphoric acids from the viewpoint of dispersibility; from the viewpoint of low cost, preferable among these are ammonium salts of non-fluorocarboxylic acids, non-fluorosulfonic acids, and non-fluorophosphoric acids.

Examples of the inorganic ammonium salt include compounds disclosed in JP 9-111081 A, such as ammonium sulfate, ammonium carbonate, ammonium nitrate, and ammonium phosphate. Preferable among these is ammonium phosphate in consideration of cross-linking characteristics.

In addition, acetaldehyde ammonia, hexamethylenetetramine, formamidine, formamidine hydrochloride, formamidine acetate, t-butylcarbamate, benzylcarbamate, $HCF_2CF_2CH(CH_3)OCONH_2$, and phthalamide can be used.

Each of these ammonia-generating compounds (D1) may be used alone, or two or more of these may be used in combination.

(D2) Particulate Inorganic Nitride

The particulate inorganic nitride (D2) is not particularly limited. Examples thereof include silicon nitride ($Si_3N_4$), lithium nitride, titanium nitride, aluminum nitride, boron nitride, vanadium nitride, and zirconium nitride. Preferable among these is particulate silicon nitride because nano-size fine particles can be provided. Each of these particulate nitrides may be used alone, or two or more of these may be used in combination.

The particle diameter of the particulate inorganic nitride (D2) is not particularly limited; it is preferably 1000 nm or smaller, more preferably 300 nm or smaller, and further preferably 100 nm or smaller. The lower limit thereof is not particularly limited.

These particulate inorganic nitrides (D2) may be used in combination with an ammonia-generating compound (D1).

These oxazole cross-link system, thiazole cross-link system, and imidazole cross-link system are used for the following VdF rubber having a specific cross-linkable group and TFE/Pr rubber having a specific cross-linkable group.

(Vdf Rubber Having Specific Cross-linkable Group)

The specific VdF rubber is a VdF rubber which is a copolymer of VdF, at least one fluoroolefin selected from TFE, HFP, and fluoro(vinylether), and a monomer having a cyano group, carboxyl group, or alkoxycarbonyl group. The fluoroolefin is preferably a perfluoroolefin.

Here, it is important that the copolymerization ratio of the VdF is higher than 20 mol % in order to reduce weakness at low temperatures.

With respect to the fluoro(vinylether), one of the following compounds may be used or two or more of these may be used in combination. The compounds are those represented by formula (30):

$$CF_2=CFO(CF_2CFY^2O)_p-(CF_2CF_2CF_2O)_q-R_f^5 \quad (30)$$

wherein $Y^2$ is a fluorine atom or $—CF_3$; $R_f^5$ is a C1-C5 perfluoroalkyl group; p is an integer of 0 to 5; q is an integer of 0 to 5, or those represented by formula (31):

$$CFX=CXOCF_2OR \quad (31)$$

wherein X is F or H; R is a C1-C6 linear or branched fluoroalkyl group, a C5-C6 cyclic fluoroalkyl group, or a fluorooxyalkyl group; 1 or 2 atoms selected from H, Cl, Br, and I may be included therein.

Preferable among those represented by formulas (30) and (31) are PAVE. Perfluoro(methyl vinyl ether) or perfluoro (propyl vinyl ether) are more preferable, and in particular perfluoro(methyl vinyl ether) is preferable.

Each of these may be used alone, or any of these may be used in combination.

The copolymerization ratio of the VdF and the specific fluoroolefin is not limited as long as the ratio of the VdF is higher than 20 mol %. A preferable VdF rubber contains 45 to 85 mol % of the VdF and 55 to 15 mol % of the specific fluoroolefin, and a more preferable VdF rubber contains 50 to 80 mol % of the VdF and 50 to 20 mol % of the specific fluoroolefin.

Specifically, the combination of the VdF and the specific fluoroolefin is preferably at least one copolymer selected from a VdF/HFP copolymer, VdF/HFP/TFE copolymer, VdF/PAVE copolymer, VdF/TFE/PAVE copolymer, VdF/HFP/PAVE copolymer, and VdF/HFP/TFE/PAVE copolymer.

In the VdF/HFP copolymer, the VdF/HFP composition is preferably 45 to 85/55 to 15 mol %, more preferably 50 to 80/50 to 20 mol %, and further preferably 60 to 80/40 to 20 mol %.

In the VdF/TFE/HFP copolymer, the VdF/TFE/HFP composition is preferably 40 to 80/10 to 35/10 to 35 mol %.

In the VdF/PAVE copolymer, the VdF/PAVE composition is preferably 65 to 90/35 to 10 mol %.

In the VdF/TFE/PAVE copolymer, the VdF/TFE/PAVE composition is preferably 40 to 80/3 to 40/15 to 35 mol %.

In the VdF/HFP/PAVE copolymer, the VdF/HFP/PAVE composition is preferably 65 to 90/3 to 25/3 to 25 mol %.

In the VdF/HFP/TFE/PAVE copolymerization, the VdF/HFP/TFE/PAVE composition is preferably 40 to 90/0 to 25/0 to 40/3 to 35, and more preferably 40 to 80/3 to 25/3 to 40/3 to 25 mol %.

The amount of the monomer having a cyano group, carboxyl group, or alkoxycarbonyl group is preferably 0.1 to 5 mol %, and more preferably 0.3 to 3 mol %, relative to the total amount of the VdF and the specific fluoroolefin for good cross-linking characteristics and heat resistance.

Examples of the monomer having a cyano group, carboxyl group, or alkoxycarbonyl group include monomers represented by formulas (32) to (35):

$$CY^1_2=CY^1(CF_2)_n-X^1 \quad (32)$$

wherein $Y^1$ is a hydrogen atom or a fluorine atom; n is an integer of 1 to 8;

$$CF_2=CFCF_2R_f^6-X^1 \quad (33)$$

wherein $R_f^6$ is $—(OCF_2)_n—$ or $—(OCF(CF_3))_n—$; n is an integer of 0 to 5;

$$CF_2=CF(OCF_2CF(CF_3))_mO(CF_2)_n-X^1 \quad (34)$$

wherein m is an integer of 0 to 5; n is an integer of 1 to 8;

$$CF_2=CF(OCF_2CF(CF_3))_m-X^1 \quad (35)$$

wherein m is an integer of 1 to 5;
in formulas (32) to (35), $X^1$ is a cyano group (—CN group), carboxyl group (—COOH group), or alkoxycarbonyl group (—COOR group, R is a C1-C10 alkyl group optionally having a fluorine atom). Each of these may be used alone, or any of these may be used in combination.

The VdF rubber having these specific cross-linkable groups may be produced by a common method.

These cross-linkable groups may be introduced by the method disclosed in WO 00/05959.

The VdF rubber having a specific cross-linkable group preferably has a Mooney viscosity ($ML_{1+10}(121°C.)$) of 5 to 140, further preferably 5 to 120, and particularly preferably 5 to 100, for good processibility.

(TFE/Pr Rubber Having Specific Cross-linkable Group)

The Tfe/PR Rubber Having a Specific Cross-Linkable Group is a non-perfluororubber having 40 to 70 mol % of TFE units, 30 to 60 mol % of Pr units, and monomer units having cyano groups, carboxyl groups, or alkoxycarbonyl groups.

The rubber may have 0 to 15 mol % of VdF units and/or 0 to 15 mol % of PAVE units if necessary.

The amount of the TFE units is 40 to 70 mol %, and preferably 50 to 65 mol %; the TFE units in such an amount provide elastomeric properties with Pr units.

The amount of the Pr units is 30 to 60 mol %, and preferably 35 to 50 mol %; the Pr units in such an amount provide elastomeric properties with TFE units.

With respect to the monomers having a cyano group, carboxyl group, or alkoxycarbonyl group, the monomers mentioned as preferable for the VdF rubber having a specific cross-linkable group can be also used for the TFE/Pr rubber having a specific cross-linkable group.

The amount of the VdF units or PAVE units, which are not essential units, is preferably up to 15 mol %, and further preferably up to 10 mol %. A larger amount of the former units causes poor amine resistance, while a larger amount of the latter units causes high cost.

The TFE/Pr rubber having a specific cross-linkable group generally has a Mooney viscosity ($ML_{1+10}(121°C.)$) of 5 to 100. A Mooney viscosity of less than 5 causes poor cross-linkability, so that a cross-linked rubber cannot tend to have sufficient physical properties. In contrast, a Mooney viscosity of higher than 100 causes poor fluidity, and thus tends to cause poor molding processibility. The Mooney viscosity ($ML_{1+10}(121°C.)$) is preferably 10 to 80.

The TFE/Pr rubber having a specific cross-linkable group may be produced by a common emulsion polymerization method, but the polymerization rate of TFE and Pr is relatively slow in this method. In the two-step polymerization (seed polymerization) method, for example, the rubber can be efficiently produced.

The amount of the oxazole, thiazole, or imidazole cross-linking agent is preferably 0.1 to 20 parts by mass, and more preferably 0.5 to 10 parts by mass, to 100 parts by mass of the specific fluororubber. If the amount of the cross-linking agent is less than 0.1 parts by mass, the mechanical strength, heat resistance, and chemical resistance tend not to be sufficient for practical use. In contrast, if the amount thereof is more than 20 parts by mass, cross-linking tends to take a long time and a cross-linked product tends to be hard, likely resulting in flexibility loss.

In the case of using a cross-linking aid (D) in combination in these oxazole cross-link system, thiazole cross-link system, and imidazole cross-link system, the amount of the cross-linking aid (D) is 0.01 to 10 parts by mass, preferably 0.02 to 5 parts by mass, and more preferably 0.05 to 3 parts by mass, to 100 parts by mass of the aforementioned specific fluororubber, in general.

(Triazine Cross-link System)

The triazine cross-link system is a cross-link system which causes a low compression set and excellent heat resistance. In the triazine cross-link system, only a cross-linking aid (D) that initiates cross-linking reaction is used.

Examples of the cross-linking aid (D) used in the triazine cross-link system include (D1) compounds generating ammonia at 40° C. to 330° C. and (D2) particulate inorganic nitrides which are cross-linking aids capable of being used together with a cross-linking agent in the oxazole cross-link system, thiazole cross-link system, and imidazole cross-link system.

Of the specific cross-linkable group-containing fluororubbers which are the targets of the oxazole cross-link system, thiazole cross-link system, and imidazole cross-link system, the target fluororubber of the triazine cross-link system is preferably a fluororubber in which at least one cross-linkable group is a cyano group.

The amount of the ammonia-generating compound (D1) may be appropriately adjusted depending on the amount of ammonia to be generated. In general, the amount thereof is 0.05 to 10 parts by mass, preferably 0.1 to 5 parts by mass, and more preferably 0.2 to 3 parts by mass, to 100 parts by mass of the cyano group-containing fluororubber. Too small an amount of the ammonia-generating compound tends to cause a low cross-linking density, so that the heat resistance and chemical resistance tend to be insufficient for practical use. In contrast, too large an amount thereof may cause scorch, so that the storage stability tends to be poor.

The amount of the particulate inorganic nitride (D2) is generally 0.1 to 20 parts by mass, preferably 0.2 to 5 parts by mass, and more preferably 0.2 to 1 parts by mass, to 100 parts by mass of the cyano group-containing fluororubber. If the amount of the particulate inorganic nitride (D2) is less than 0.1 parts by mass, the cross-linking density tends to be low, so that the heat resistance and chemical resistance tend to be insufficient for practical use. If the amount thereof is more than 20 parts by mass, scorch may occur, so that the storage stability tends to be poor.

In the present invention, the cross-link system is preferably the peroxide cross-link system, polyol cross-link system, oxazole cross-link system, thiazole cross-link system, imidazole cross-link system, or triazine cross-link system. Particularly preferable is the peroxide cross-link system, oxazole cross-link system, thiazole cross-link system, imidazole cross-link system, or triazine cross-link system. In the respective cross-link systems, it is preferable to use a suitable cross-linking agent (C) or cross-linking aid (D).

If necessary, the fluororubber composition of the present invention may further contain common additives for rubber such as filler, processing aid, plasticizer, colorant, tackifier, adhesion promoter, acid acceptor, pigment, flame retardant, lubricant, photo stabilizer, weather-resistant stabilizer, antistatic agent, ultraviolet absorber, antioxidant, release agent, foaming agent, perfume, oil, and softener, and other polymers such as polyethylene, polypropylene, polyamide, polyester, and polyurethane to the extent that the effects of the present invention are not deteriorated.

Examples of the filler include: metal oxides such as calcium oxide, magnesium oxide, titanium oxide, and aluminum oxide; metal hydroxides such as magnesium hydroxide, aluminum hydroxide, and calcium hydroxide; carbonates such as magnesium carbonate, aluminum carbonate, calcium carbonate, and barium carbonate; silicates such as magnesium silicate, calcium silicate, sodium silicate, and aluminum silicate; sulfates such as aluminum sulfate, calcium sulfate, and barium sulfate; metal sulfides such as synthesized hydrotalcite, molybdenum disulfide, iron sulfide, and copper sulfide; diatomaceous earth, asbestos, lithopone (zinc sulfide/barium sulfide), graphite, carbon fluoride, calcium fluoride, coke, fine particulate quartz, talc, powdery mica, Wollastonite, fibrous carbon, fibrous aramid, various whiskers, fibrous glass, organic reinforcing agent, organic filler, polytetrafluoroethylene, mica, silica, celite, and clay. Further, examples of the acid acceptor include calcium oxide, magnesium oxide, lead oxide, zinc oxide, magnesium hydroxide, calcium hydroxide, aluminum hydroxide, and hydrotalcite. Each of these may be used alone, or two or more of these may be appropriately used in combination. These may be added at any step in the aforementioned mixing method; they are preferably added upon mixing the fluororubber and the carbon black with an internal mixer or a roll mixer.

Examples of the processing aid include: higher fatty acids such as stearic acid, oleic acid, palmitic acid, and lauric acid; higher fatty acid salts such as sodium stearate and zinc stearate; higher fatty acid amides such as stearamide and oleamide; higher fatty acid esters such as ethyl oleate; petroleum wax such as carnauba wax and ceresin wax; polyglycols such as ethylene glycol, glycerine, and diethylene glycol; aliphatic hydrocarbons such as vaseline and paraffin; silicone oils, silicone polymers, low molecular weight polyethylene, phthalic acid esters, phosphoric acid esters, rosin, (halogenated) dialkylamines, surfactants, sulfone compounds, fluorine-based processing aids, and organic amine compounds.

In particular, the organic amine compound and the acid acceptor are preferable additives because, in the case that they are blended upon mixing the fluororubber (A) and the carbon black (B) with an internal mixer or a roll mixer, they improve reinforceability. The mixing is preferably performed at the highest mixing temperature Tm of 80° C. to 220° C.

Preferable examples of the organic amine compound include primary amines represented as $R^1NH_2$, secondary amines represented as $R^1R^2NH$, and tertiary amine represented as $R^1R^2R^3N$. $R^1$, $R^2$, and $R^3$ may be the same as or different from each other and each of these is preferably a C1-C50 alkyl group. The alkyl group may have a benzene ring as a functional group, or may have a double bond and/or conjugated double bond. Further, the alkyl group may have a linear shape or a branched shape.

Examples of the primary amine include coconut amine, octyl amine, lauryl amine, stearyl amine, oleyl amine, beef tallow amine, 17-phenyl-heptadecylamine, octadeca-7,11-dienylamine, octadeca-7,9-dienylamine, octadec-9-enylamine, 7-methyl-octadec-7-enylamine. Examples of the secondary amine include distearylamine. Examples of the tertiary amine include dimethyloctylamine, dimethyldecylamine, dimethyllaurylamine, dimethylmyristylamine, dimethylpalmitylamine, dimethylstearylamine, and dimethylbehenylamine. Particularly preferable are amines, especially primary amines, having about 20 carbon atoms because they are easily available and they improve reinforceability.

The amount of the organic amine compound is preferably 0.01 to 5 parts by mass to 100 parts by mass of the fluororubber (A). Too large an amount of the organic amine compound tends to cause difficulty in mixing, while too small an amount thereof tends to cause poor reinforceability. The amount with respect to 100 parts by mass of the fluororubber (A) is further preferably 0.1 parts by mass or more from the viewpoint of reinforceability and 4 parts by mass or less from the viewpoints of reinforceability and easy mixing.

The acid acceptor is preferably a metal hydroxide such as calcium hydroxide; a metal oxide such as magnesium oxide or zinc oxide; or hydrotalcite among the aforementioned examples from the viewpoint of reinforceability, for example, and it is particularly preferably zinc oxide.

The amount of the acid acceptor is preferably 0.01 to 10 parts by mass to 100 parts by mass of the fluororubber (A). Too large an amount of the acid acceptor tends to cause poor physical properties, while too small an amount thereof tends to cause poor reinforceability. The amount with respect to 100 parts by mass of the fluororubber (A) is further preferably 0.1 parts by mass or more from the viewpoint of reinforceability, while it is preferably 8 parts by mass or less, and more preferably 5 parts by mass or less, from the viewpoints of physical properties and easy mixing.

Examples of the tackifier include coumarone resin, coumarone-indene resin, coumarone-indene-styrene resin, naphthene resin, phenol resin, rosin, rosin ester, hydrogenated rosin derivative, terpene resin, modified terpene resin, terpene-phenol resin, hydrogenated terpene resin, α-pinene resin, alkylphenol-acethylene resin, alkylphenol-formaldehyde resin, styrene resin, C5 petroleum resin, C9 petroleum resin, cycloaliphatic petroleum resin, C5/C9 copolymer petroleum resin, xylene-formaldehyde resin, polyfunctional methacrylates, polyfunctional acrylates, metal oxides (e.g. magnesium oxide), and metal hydroxides. The amount thereof is preferably 1 to 20 parts by mass to 100 parts by mass of the fluororubber (A). These tackifier may be used alone, or two or more of these may be used in combination.

The belt of the present invention comprises a cross-linked fluororubber layer obtainable by cross-linking the above mentioned fluororubber composition.

In the present invention, the fluororubber composition may be cross-linking by an appropriately selected method.

Examples of the method include common methods of cross-linking a belt such as cross-linking methods using a press cross-linking machine, continuous cross-linking machine, or cross-linking can.
Also, Examples of the method include common methods of molding a belt molding methods using a rubber molding machine (e.g. a molding drum, compression press, encapsulation-molding machine, and injection-molding machine).

The obtained cross-linked fluororubber layer has a loss modulus $E''$ of 400 kPa or higher and 6000 kPa or lower determined by a dynamic viscoelasticity test (measurement mode: tensile, chuck distance: 20 mm, measurement temperature: 160° C., tensile strain: 1%, initial force: 157 cN, and frequency: 10 Hz).

If the loss modulus $E''$ is within the above range, the rubber layer has particularly excellent normal state at room temperature and mechanical properties at high temperatures. The lower limit thereof is preferably 420 kPa, more preferably 430 kPa, and further preferably 450 kPa or higher; while the upper limit thereof is preferably 5,900 kPa, and more preferably 5,800 kPa.

For improved mechanical properties at high temperatures, the cross-linked fluororubber layer further preferably has a storage modulus $E'$ of 1,500 kPa or higher and 20,000 kPa or lower determined by a dynamic viscoelasticity test (measurement mode: tensile, chuck distance: 20 mm, measurement temperature: 160° C., tensile strain: 1%, initial force: 157 cN, and frequency: 10 Hz). The lower limit thereof is preferably 1,600 kPa, and more preferably 1,800 kPa, while the upper limit thereof is preferably 19,000 kPa, and more preferably 18,000 kPa.

The cross-linked fluororubber layer preferably has an elongation at break at 160° C. of 140 to 700%, more preferably 150 to 700%, further preferably 180% or higher, and particularly preferably 200% or higher, while preferably 650% or lower, and particularly preferably 600% or lower, because such a rubber layer is suitably used under high-temperature conditions.

The cross-linked fluororubber layer preferably has a tensile strength at break at 160° C. of 3 to 20 MPa, further preferably 3.5 MPa or higher, and particularly preferably 4 MPa or higher, while preferably 17 MPa or lower, and particularly preferably 15 MPa or lower, because such a rubber layer is suitably used under high-temperature conditions. The tensile strength at break and the elongation at break are measured using a #6 dumbbell in accordance with JIS-K 6251.

The cross-linked fluororubber layer preferably has a tear strength at 160° C. of 3 to 30 kN/m, further preferably 4 kN/m or higher, and particularly preferably 5 kN/m or higher, while preferably 29 kN/m or lower, and particularly preferably 28 kN/m or lower, because such a rubber layer is suitably used under high-temperature conditions.

The cross-linked fluororubber layer preferably has an elongation at break at 200° C. of 110 to 700%, more preferably 120 to 700%, further preferably 150% or higher, and particularly preferably 200% or higher, while preferably 650% or lower, and particularly preferably 600% or lower, because such a rubber layer is suitably used under high-temperature conditions. The tensile strength at break and the elongation at break is measured using a #6 dumbbell in accordance with JIS-K 6251.

The cross-linked fluororubber layer preferably has a tensile strength at break at 200° C. of 2 to 20 MPa, further preferably 2.2 MPa or higher, and particularly preferably 2.5 MPa or higher, while preferably 17 MPa or lower, and particularly preferably 15 MPa or lower, because such a rubber layer is suitably used under high-temperature conditions.

The cross-linked fluororubber layer preferably has a tear strength at 200° C. of 3 to 30 kN/m, further preferably 4 kN/m or higher, and particularly preferably 5 kN/m or higher, while preferably 29 kN/m or lower, and particularly preferably 28 kN/m or lower, because such a rubber layer is suitably used under high-temperature conditions.

The cross-linked fluororubber layer preferably has an elongation at break at 230° C. of 80 to 700%, more preferably 100 to 700%, further preferably 120% or higher, and particularly preferably 130% or higher, while preferably 650% or lower, and particularly preferably 600% or lower, because such a rubber layer is suitably used under high-temperature conditions.

The cross-linked fluororubber layer preferably has a tensile strength at break at 230° C. of 1 to 20 MPa, further preferably 1.2 MPa or higher, and particularly preferably 1.5 MPa or higher, while preferably 17 MPa or lower, and particularly preferably 15 MPa or lower, because such a rubber layer is suitably used under high-temperature conditions.

The cross-linked fluororubber layer preferably has a tear strength at 230° C. of 3 to 30 kN/m, further preferably 4 kN/m or higher, and particularly preferably 5 kN/m or higher, while preferably 29 kN/m or lower, and particularly preferably 28 kN/m or lower, because such a rubber layer is suitably used under high-temperature conditions.

Since the belt of the present invention comprises a fluororubber, it is excellent in heat-aging resistance, chemical resistance, and oil resistance; further, owing to the aforementioned structure, the hose is excellent not only in heat-aging resistance and oil resistance but also in mechanical properties at high temperatures.

The belt of the present invention can be suitably used for the following belts.

That is, the belt can be used as a power transmission belt (including flat belts, V belts, V-ribbed belts, and synchronous belts), a belt for conveyance (conveyer belt), or the like. Further, in the fields relating to semiconductor production, e.g. semiconductor producing devices, liquid crystal panel producing devices, plasma panel producing devices, plasma-addressed liquid crystal panels, field emission display panels, and solar battery substrates, the cross-linked fluororubber product may be used as a belt for devices under high-temperature conditions such as CVD devices, dry etching devices, wet etching devices, oxidation diffusion devices, sputtering devices, asking devices, washing devices, ion implanting devices, and gas discharging devices.

Examples of the flat belt include flat belts for high-temperature components such as ones arranged around the engine of an agricultural machine, a machine tool, an industrial machine, or the like. Examples of the conveyer belt include conveyer belts for conveying bulks and granules such as coal, crushed stones, earth and sand, mineral, and wood chips at high temperatures; conveyer belts used in a blast furnace or the like in iron works; and conveyer belts for use at high temperatures in a precision-instruments assembly plant, a food factory, or the like. Examples of the V belt and the V-ribbed belt include V belts and V-ribbed belts for agricultural machines, general machinery (e.g. OA equipment, a printing machine, business-use drier), and vehicles. Examples of the synchronous belt include synchronous belts such as transmission belts of transfer robots, transmission belts for food machines and machine tools, and transmission belts for vehicles, OA equipment, medical use, and printing machines. Specific examples of the synchronous belt for a vehicle include timing belts.

Here, the belt of the present invention may have a monolayer structure or a multilayer structure. If having a multilayer structure, the belt of the present invention may comprise the cross-linked fluororubber layer and layers made of other materials. In multilayer belts, layers made of other materials may be layers made of other rubbers, thermoplastic resin layers, fiber-reinforced layers, canvas, and metal foil layers, for example.

In the case that chemical resistance and flexibility are particularly required, other rubbers preferably include at least one selected from the group consisting of acrylonitrile-butadiene rubber and hydrogenated rubber thereof, rubber blend of acrylonitrile-butadiene rubber and polyvinyl chloride, fluororubber, epichlorohydrin rubber, EPDM, and acrylic rubber. They more preferably include at least one selected from the group consisting of acrylonitrile-butadiene rubber and hydrogenated rubber thereof, rubber blend of acrylonitrile-butadiene rubber and polyvinyl chloride, fluororubber, and epichlorohydrin rubber.

Further, the thermoplastic resin is preferably a thermoplastic resin comprising at least one selected from the group consisting of fluorine resin, polyamide resin, polyolefin resin, polyester resin, polyvinyl alcohol resin, polyvinyl chloride resin, and polyphenylene sulfide resin. The thermoplastic resin is more preferably a thermoplastic resin comprising at least one selected from the group consisting of fluorine resin, polyamide resin, polyvinyl alcohol resin, and polyphenylene sulfide resin.

In the case of forming a multilayer belt, surface treatment may be optionally performed. The surface treatment is not particularly limited as long as it allows bonding. Examples thereof include discharging treatment such as plasma discharge and corona discharge, and wet treatment such as treatment with a metallic sodium/naphthalene solution. Further, priming is suitable as surface treatment. Priming can be performed in accordance with a common method. In the case of priming, the surface of a fluorine rubber which is not surface-treated may be treated; it is more effective to perform priming after prior treatment such as plasma discharge, corona discharge, or treatment with a metallic sodium/naphthalene solution.

EXAMPLES

The present invention will be described referring to, but not limited to, examples.

Measurement methods of physical properties adopted in the present invention are as follows.

(1) Dynamic Viscoelasticity Test 1 (Loss Modulus E" and Storage Modulus E')
(Measurement Device)
Dynamic viscoelasticity measurement device DVA-220 (IT Keisoku Seigyo K.K.)
(Measurement Conditions)
Strain distribution is measured under the following conditions, and then the loss modulus E" and the storage modulus E' at 1% tensile strain are calculated.
Specimen: cross-linked rubber cuboid having a size of 3 mm in width×2 mm in thickness
Measurement mode: tensile
Chuck distance: 20 mm
Measurement temperature: 160° C.
initial force: 157 cN
Frequency: 10 Hz
(2) Dynamic Viscoelasticity Test 2 (Shear Modulus G')
(Measurement Device)
Rubber process analyzer (model: RPA2000, ALPHA TECHNOLOGY Co., LTD.)
(Measurement Conditions)
Strain distribution is measured at 100° C. and 1 Hz, whereby the shear modulus G' is determined. At this time, G' is measured for the respective dynamic strains 1% and 100%, and thereby $\delta G'$ (G' (1%)–G'(100%)) is calculated.
(3) Tensile Strength at Break and Elongation at Break
The tensile strength and elongation at break are measured using RTA-1T (ORIENTEC Co., LTD.), AG-I (SHIMADZU Corp.), and a dumbbell #6 in accordance with JIS-K 6251. The measurement temperatures are 25° C., 160° C., 200° C., and 230° C.
(4) Mooney viscosity ($ML_{1+10}(100°$ C.))
The Mooney viscosity was determined in accordance with ASTM-D 1646 and JIS-K 6300. The measurement temperature is 100° C.

In the examples and comparative examples, the following fluororubber, carbon black, cross-linking agent, and cross-linking accelerator were used.
(Fluororubber)
A1: Pure water (44 L), a 50% aqueous solution of $CH_2=CFCF_2OCF(CF_3)CF_2OCF(CF_3)COONH_4$ (8.8 g), and a 50% aqueous solution of $F(CF_2)_3COONH_4$ (176 g) were charged into a 82-L stainless-steel autoclave, and the air inside the system was sufficiently replaced with nitrogen gas.

The mixture was stirred at 230 rpm and heated to 80° C. under stirring at 230 rpm, and then monomers were injected under pressure so that the initial monomer composition in the tank was VdF/HFP=50/50 mol % and 1.52 MPa was achieved. A polymerization initiator solution prepared by dissolving APS (1.0 g) into pure water (220 ml) was injected under nitrogen gas pressure, and thus a reaction was initiated. When the internal pressure was down to 1.42 MPa as the polymerization proceeded, a mixed monomer (VdF/HFP=78/22 mol %), which is an additional monomer, was injected under pressure until the internal pressure reached 1.52 MPa. At this time, a diiodine compound $I(CF_2)_4I$ (73 g) was injected under pressure. While the pressure was repeatedly increased and decreased, an aqueous solution of APS (1.0 g)/pure water (220 ml) was injected under nitrogen gas pressure every 3 hours, and thereby the polymerization reaction was continued. As 14,000 g in total of the mixed monomer was added, unreacted monomers were removed and the autoclave was cooled down. Thereby, a fluororubber dispersion with a solid content concentration of 23.1% by mass was obtained. NMR analysis on the fluororubber showed that the copolymer composition was VdF/HFP=78/22 (mol %), and the Mooney viscosity ($ML_{1+10}(100°$ C.)) was 55. This fluororubber was named Fluororubber A1.

A2: Except that the initial monomer in the tank was VdF/TFE/HFP=19/11/70 mol %, the additional monomer was VdF/TFE/HFP=51/20/29 mol %, and the amount of the diiodine compound $I(CF_2)_4I$ was 45 g, polymerization was performed in the same manner as in the method of producing Fluororubber A1. Thereby, a dispersion with a solid content concentration of 22.8% by mass was obtained. The copolymer composition of this fluororubber was VdF/TFE/HFP=52/22/26 (mol %), and the Mooney viscosity ($ML_{1+10}(100°$ C.)) was 74. This fluororubber was named Fluororubber A2.

A3: Except that the initial monomer in the tank was VdF/TFE/HFP=19/11/70 mol %, the additional monomer was VdF/TFE/HFP=51/20/29 mol %, and the amount of the diiodine compound $I(CF_2)_4I$ was 37 g, polymerization was performed in the same manner as in the method of producing Fluororubber A1. Thereby, a dispersion with a solid content concentration of 22.5% by mass was obtained. The copolymer composition of this fluororubber was VdF/TFE/HFP=50/20/30 (mol %), and the Mooney viscosity ($ML_{1+10}(100°$ C.)) was 88. This fluororubber was named Fluororubber A3.

A4: Except that the initial monomer in the tank was VdF/TFE/HFP=19/11/70 mol %, the additional monomer was VdF/TFE/HFP=51/20/29 mol %, and the amount of the diiodine compound $I(CF_2)_4I$ was 45 g, and $ICH_2CF_2CF_2OCF=CF_2$ (74 g) was added as 630 g in total of the mixed monomer was added, polymerization was performed in the same manner as in the method of producing Fluororubber A1. Thereby, a dispersion with a solid content concentration of 23.2% by mass was obtained. The copolymer composition of this fluororubber was VdF/TFE/HFP=52/22/26 (mol %), and the Mooney viscosity ($ML_{1+10}(100°$ C.)) was 75. This fluororubber was named Fluororubber A4.

(Carbon Black)
B1: HAF ($N_2SA$=79 $m^2$/g, DBP oil absorption=101 ml/100 g), "SEAST 3" (trade name, Tokai Carbon Co., Ltd.)
B2: MT ($N_2SA$=8 $m^2$/g, DBP oil absorption=43 ml/100 g), "Thermax N 990" (trade name, Cancarb)
B3: FEF ($N_2SA$=42 $m^2$/g, DBP oil absorption=115 ml/100 g), "SEAST SO" (trade name, Tokai Carbon Co., Ltd.)
B4: ISAF ($N_2SA$=119 $m^2$/g, DBP oil absorption=114 ml/100 g), "SEAST 6" (trade name, Tokai Carbon Co., Ltd.)

(Cross-linking Agent)
2,5-Dimethyl-2,5-di(t-butylperoxy)hexane, "PERHEXA 25B" (trade name, NOF Corp.)
(Cross-Linking Accelerator)
Triallyl isocyanurate (TAIC), "TAIC" (trade name, Nippon Kasei Chemical Co., Ltd.)
(Processing Aid)
Stearylamine (FARMIN 86T, Kao Corp.)
(Acid Acceptor)
Zinc oxide (#1, Sakai Chemical Industry Co., Ltd.)

Example 1

Fluororubber A1 (100 parts by mass) was mixed with Carbon black B1 (30 parts by mass) using a mixer (TD 35 100 MB, Toshin Co., Ltd., rotor diameter: 30 cm, tip clearance: 0.1 cm) under the mixing conditions of front rotor speed: 29 rpm and back rotor speed: 24 rpm. Thereby, a fluororubber precompound was prepared. The maximum temperature of the discharged mixed product was 170° C.

Thereafter, the fluororubber precompound was mixed with a cross-linking agent (1 part by mass), a cross-linking accelerator (TAIC, 1.5 parts by mass), and zinc oxide (1 part by mass) for 30 minutes using an 8-inch open roll mixer (KANSAI ROLL Co., Ltd.) under the mixing conditions of front roll speed: 21 rpm, back roll speed: 19 rpm, and gap distance between rolls: 0.1 cm. Thereby, a fluororubber full compound was prepared. The maximum temperature of the discharged mixed product was 71° C.

Then, the obtained fluororubber full compound was subjected to the dynamic viscoelasticity test 2, and thereby the δG' was determined. Table 1 shows the results.

Further, this fluororubber full compound was pressed at 160° C. for 30 minutes to be cross-linked, so that a 2-mm thick sheet specimen was produced. Using the obtained cross-linked sheet, the elongation at break and tensile strength were measured. Table 1 shows the results.

Furthermore, the obtained cross-linked fluororubber was subjected to the dynamic viscoelasticity test 1, and thereby the loss modulus E'' and storage modulus E' were determined. Table 1 shows the results.

Examples 2 and 3

The fluororubber A1 (100 parts by mass) was mixed with one of the carbon blacks B1 and B2, a cross-linking agent, cross-linking accelerator (TAIC), and zinc oxide each in an amount shown in Table 1 for 30 minutes using an 8-inch open roll mixer (KANSAI ROLL Co., Ltd.) under the conditions of front roll speed: 21 rpm, back roll speed: 19 rpm, and gap distance between rolls: 0.1 cm. Thereby, a fluororubber full compound was prepared. The maximum temperature of the discharged mixed product was 70° C.

The obtained fluororubber full compound was subjected to the dynamic viscoelasticity test 2, and thereby the δG' was determined. Table 1 shows the results.

Then, the obtained fluororubber full compound was pressed at 160° C. for 30 minutes to be cross-linked. Thereby, a 2-mm thick sheet specimen was prepared. The tensile strength at break and the elongation at break of the obtained cross-linked sheet were measured. Table 1 shows the results.

Further, the obtained cross-linked fluororubber was subjected to the dynamic viscoelasticity test 1, and thereby the loss modulus E'' and storage modulus E' were determined. Table 1 shows the results.

Example 4

The fluororubber (A1, 100 parts by mass) was mixed with the carbon black (B3, 20 parts by mass), stearylamine (0.5 parts by mass), and zinc oxide (1.0 part by mass) using a mixer (MixLabo 0.5 L, Moriyama Company Ltd., rotor diameter: 6.6 cm, tip clearance: 0.05 cm) under the mixing conditions of front rotor speed: 60 rpm and back rotor speed: 50 rpm. Thereby, a fluororubber precompound was prepared. The maximum temperature of the discharged mixed product was 175° C.

The obtained fluororubber precompound (121.5 parts by mass) was mixed with a cross-linking agent (0.75 parts by mass), cross-linking accelerator (TAIC, 0.5 parts by mass), and stearylamine (0.5 parts by mass) for 30 minutes using an 8-inch open roll mixer (KANSAI ROLL Co., Ltd.) under the mixing conditions of front roll speed: 21 rpm, back roll speed: 19 rpm, and gap distance between rolls: 0.1 cm. Thereby, a fluororubber full compound was prepared. The maximum temperature of the discharged mixed product was 71° C.

Then, the obtained fluororubber full compound was subjected to the dynamic viscoelasticity test 2, and thereby the δG' was determined. Table 1 shows the results.

Further, this fluororubber full compound was pressed at 170° C. for 30 minutes to be cross-linked, so that a 2-mm thick sheet specimen was produced. Using the obtained cross-linked sheet, the elongation at break and tensile strength were determined. Table 1 shows the results.

Furthermore, the obtained cross-linked fluororubber was subjected to the dynamic viscoelasticity test 1, and thereby the loss modulus E" and storage modulus E' were determined. Table 1 shows the results.

Example 5

Except that the carbon black (B4) was used, a fluororubber precompound was prepared in the same manner as in Example 4. The maximum temperature of the discharged mixed product was 168° C. In addition, except that the amount of the cross-linking accelerator (TAIC) was changed to 4 parts by mass, a fluororubber full compound was prepared under the same conditions as in Example 4. The maximum temperature of the discharged mixed product was 73° C. Table 1 shows the results.

Example 6

Except that the mixer (MixLabo 0.5 L, Moriyama Company Ltd., rotor diameter: 6.6 cm, tip clearance: 0.05 cm) was operated with front rotor speed: 120 rpm and back rotor speed: 107 rpm, a fluororubber composition precompound was prepared under the same conditions as in Example 5. The maximum temperature of the discharged mixed product was 175° C. In addition, except that the amount of the cross-linking accelerator (TAIC) was changed to 0.5 parts by mass, a fluororubber full compound was prepared under the same conditions as in Example 5. The maximum temperature of the discharged mixed product was 72° C. Table 1 shows the results.

Example 7

Except that the fluororubber (A4) and the carbon black (B4) were used, a fluororubber precompound was prepared under the same conditions as in Example 4. The maximum temperature of the discharged mixed product was 170° C. In addition, a fluororubber full compound was prepared under the same conditions as in Example 4. The maximum temperature of the discharged mixed product was 70° C. Table 1 shows the results.

Comparative Examples 1 and 2

Except that the fluororubber and carbon black shown in Table 1 were used, mixing was performed in the same manner as in Example 3, so that a fluororubber full compound was prepared. The maximum temperature of the discharged mixed product was 73° C.

The obtained fluororubber full compound was subjected to the dynamic viscoelasticity test 2, and thereby the δG' was determined. Table 1 shows the results.

Then, the obtained fluororubber full compound was pressed at 160° C. for 30 minutes to be cross-linked, so that a 2-mm thick sheet specimen was produced. Using the obtained cross-linked sheet, the tensile strength at break and elongation at break were determined. Table 1 shows the results.

Further, the obtained cross-linked fluororubber was subjected to the dynamic viscoelasticity test 1, and thereby the loss modulus E" and storage modulus E' were determined. Table 1 shows the results.

TABLE 1

| | Example 1 | Example 2 | Example 3 | Example 4 | Example 5 | Example 6 | Example 7 | Comparative Example 1 | Comparative Example 2 |
|---|---|---|---|---|---|---|---|---|---|
| Composition (parts by mass) | | | | | | | | | |
| Fluororubber A1 | 100 | 100 | 100 | 100 | 100 | 100 | — | — | — |
| Fluororubber A2 | — | — | — | — | — | — | — | 70 | 100 |
| Fluororubber A3 | — | — | — | — | — | — | — | 30 | — |
| Fluororubber A4 | — | — | — | — | — | — | 100 | — | — |
| Carbon black B1 | 30 | 30 | — | — | — | — | — | — | — |
| Carbon black B2 | — | — | 30 | — | — | — | — | 10 | 10 |
| Carbon black B3 | — | — | — | 20 | — | — | — | — | — |
| Carbon black B4 | — | — | — | — | 20 | 20 | 20 | — | — |
| Cross-linking accelerator | 1.5 | 1.5 | 1.5 | 0.5 | 4 | 0.5 | 0.5 | 2 | 2 |
| Cross-linking agent | 1 | 1 | 1 | 0.75 | 0.75 | 0.75 | 0.75 | 1 | 1 |
| Zinc oxide | 1 | 1 | 1 | 1 | 1 | 1 | 1 | — | — |
| Magnesium oxide | — | — | — | — | — | — | — | 10 | 10 |
| Stearylamine | — | — | — | 1 | 1 | 1 | 1 | — | — |
| Press-cross-linking conditions | 160° C. 30 min. | 160° C. 30 min. | 160° C. 30 min. | 170° C. 30 min. | 170° C. 30 min. | 170° C. 30 min. | 170° C. 30 min. | 160° C. 30 min. | 160° C. 30 min. |
| Difference δ G' (G'(1%)-G'(100%)) | 481 | 432 | 176 | 430 | 559 | 652 | 609 | 209 | 140 |
| Mechanical properties of cross-linked product | | | | | | | | | |

TABLE 1-continued

|  | Example 1 | Example 2 | Example 3 | Example 4 | Example 5 | Example 6 | Example 7 | Comparative Example 1 | Comparative Example 2 |
|---|---|---|---|---|---|---|---|---|---|
| Measurement temperature 25° C. | | | | | | | | | |
| Tensile strength at break (MPa) | 22.6 | 22.5 | 11.3 | 13.4 | 23.1 | 19.6 | 21.6 | 19.1 | 17.0 |
| Tensile elongation at break (%) | 478 | 486 | 494 | 798 | 433 | 688 | 348 | 345 | 320 |
| Measurement temperature 160° C. | | | | | | | | | |
| Tensile strength at break (MPa) | 7.2 | 6.3 | 3.5 | 3.5 | 6.0 | 3.8 | 4.6 | 3.9 | 3.8 |
| Tensile elongation at break (%) | 344 | 308 | 194 | 429 | 233 | 404 | 190 | 132 | 122 |
| Measurement temperature 200° C. | | | | | | | | | |
| Tensile strength at break (MPa) | 5.9 | 5.6 | 2.7 | 2.9 | 4.9 | 3.2 | 3.8 | 3.1 | 3.2 |
| Tensile elongation at break (%) | 275 | 266 | 143 | 365 | 203 | 343 | 166 | 104 | 96 |
| Measurement temperature 230° C. | | | | | | | | | |
| Tensile strength at break (MPa) | 4.5 | 4.5 | 2.4 | 2.2 | 3.7 | 2.5 | 2.9 | 2.6 | 2.9 |
| Tensile elongation at break (%) | 215 | 224 | 128 | 266 | 147 | 263 | 118 | 74 | 76 |
| Dynamic viscoelasticity test (160° C.) | | | | | | | | | |
| Storage modulus E' (kPa) | 9486 | 8589 | 4862 | 3588 | 10656 | 6084 | 9156 | 6825 | 6966 |
| Loss modulus E" (kPa) | 2078 | 1804 | 523 | 906 | 1970 | 1492 | 1676 | 329 | 262 |

The invention claimed is:

1. A belt comprising:
a cross-linked fluororubber layer obtained by cross-linking a fluororubber composition comprising a fluororubber (A) and a carbon black (B),
the cross-linked fluororubber layer having a loss modulus E" of 400-6,000 kPa determined by a dynamic viscoelasticity test under conditions of measurement temperature: 160° C., tensile strain: 1%, initial force: 157 cN, and frequency: 10 Hz.

2. The belt according to claim 1,
wherein the cross-linked fluororubber layer has a storage modulus E' of 1,500-20,000 kPa determined by a dynamic viscoelasticity test under conditions of measurement temperature: 160° C., tensile strain: 1%, initial force: 157 cN, and frequency: 10 Hz.

3. The belt according to claim 1,
wherein the fluororubber composition contains 5 to 50 parts by mass of the carbon black (B) to 100 parts by mass of the fluororubber (A).

4. The belt according to claim 1,
wherein the carbon black (B) is a carbon black having a nitrogen adsorption specific surface area ($N_2SA$) of 5 to 180 m$^2$/g and a dibutyl phthalate (DBP) oil absorption of 40 to 180 ml/100 g.

5. The belt according to claim 1,
wherein the fluororubber (A) is a vinylidene fluoride copolymerized rubber, a tetrafluoroethylene/perfluoro(alkyl vinyl ether) copolymerized rubber, or a tetrafluoroethylene/propylene copolymerized rubber.

6. The belt according claim 1,
wherein the fluororubber composition further contains a cross-linking agent (C) and/or a cross-linking aid (D).

7. The belt according to claim 1,
wherein the cross-linked fluororubber layer has an elongation at break at 160° C. of 140 to 700%.

8. The belt according to claim 1,
wherein the cross-linked fluororubber layer has a tensile strength at break at 160° C. of 3 to 20 MPa.

9. The belt according to claim 1,
wherein the cross-linked fluororubber layer has an elongation at break at 200° C. of 110 to 700%.

10. The belt according to claim 1,
wherein the cross-linked fluororubber layer has a tensile strength at break at 200° C. of 2 to 20 MPa.

11. The belt according to claim 1,
wherein the cross-linked fluororubber layer has an elongation at break at 230° C. of 80 to 700%.

12. The belt according to claim 1,
wherein the cross-linked fluororubber layer has a tensile strength at break at 230° C. of 1 to 20 MPa.

13. The belt according to claim 1, which serves as a timing belt.

14. The belt according to claim 1, which serves as a conveyor belt for conveyance.

* * * * *